US010719893B2

(12) United States Patent
Meehan

(10) Patent No.: US 10,719,893 B2
(45) Date of Patent: Jul. 21, 2020

(54) SYMBOLIC RIGSTATE SYSTEM

(71) Applicant: Schlumberger Technology Corporation, Sugar Land, TX (US)

(72) Inventor: Richard John Meehan, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 146 days.

(21) Appl. No.: 15/672,461

(22) Filed: Aug. 9, 2017

(65) Prior Publication Data

US 2018/0047117 A1  Feb. 15, 2018

Related U.S. Application Data

(60) Provisional application No. 62/373,129, filed on Aug. 10, 2016.

(51) Int. Cl.
*G06F 16/22* (2019.01)
*G06Q 50/06* (2012.01)
*G06F 3/06* (2006.01)

(52) U.S. Cl.
CPC ........... *G06Q 50/06* (2013.01); *G06F 3/0628* (2013.01); *G06F 16/2291* (2019.01)

(58) Field of Classification Search
CPC ................................................. G06F 16/2291
See application file for complete search history.

(56) References Cited

U.S. PATENT DOCUMENTS

| | | | | |
|---|---|---|---|---|
| 6,820,702 | B2* | 11/2004 | Niedermayr | E21B 21/08 175/57 |
| 2011/0055622 | A1* | 3/2011 | Arai | G06F 11/2025 714/4.2 |
| 2014/0277752 | A1* | 9/2014 | Chang | E21B 44/00 700/275 |
| 2016/0094984 | A1* | 3/2016 | Singer | H04W 4/02 455/418 |

OTHER PUBLICATIONS

Lin et al., A symbolic representation of time series, with implications for streaming algorithms, DMKD'03, Jun. 13, 2003, San Diego, CA, USA, ACM 1-58113-763-x (10 pages).
Keogh et al., HOT SAX: Finding the Most Unusual Time Series Subsequence: Algorithms and Applications, per author: "Note that this is a longer version of the paper submitted to ICDM 2005. The extra material consists of additional experiments, additional important references and more detailed and intuitive explanations of some of the algorithms." Fifth IEEE International Conference on Data Mining (ICDM'05), Date of Conference: Nov. 27-30, 2005 (10 pages).
English Letter Frequency Counts: Mayzner Revisited or ETAOIN SRHLDCU, ca. 2013, http://www.norvig.com/mayzner.html (8 pages).
Letter frequency, Wikipedia, Jul. 22, 2016, 10:46 (7 pages).

* cited by examiner

*Primary Examiner* — Kris E Mackes
(74) *Attorney, Agent, or Firm* — Alec J. McGinn

(57) ABSTRACT

A method can include receiving data associated with a drilling operation in a geologic environment; determining a state based at least in part on the data; representing the state using a symbolic representation scheme that includes letters; storing the represented state in a database; and, for a combination of letters that represents a combination of states, performing a search engine based search of the database to generate a search result.

20 Claims, 25 Drawing Sheets

SYMBOLIC RIGSTATE SYSTEM

RELATED APPLICATIONS

This application claims priority to and the benefit of a US provisional application having Ser. No. 62/373,129, filed 10 Aug. 2016, which is incorporated by reference herein.

BACKGROUND

A bore can be drilled into a geologic environment where the bore may be utilized to form a well. A rig may be a system of components that can be operated to form a bore in a geologic environment, to transport equipment into and out of a bore in a geologic environment, etc. As an example, a rig may include a system that can be used to drill a bore and to acquire information about a geologic environment, drilling, etc. As an example, a rig can include one or more of the following components and/or equipment: a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform.

SUMMARY

A method can include receiving data associated with a drilling operation in a geologic environment; determining a state based at least in part on the data; representing the state using a symbolic representation scheme that includes letters; storing the represented state in a database; and, for a combination of letters that represents a combination of states, performing a search engine based search of the database to generate a search result. A system can include one or more processors; a network interface operatively coupled to the one or more processors; memory operatively coupled to the one or more processors; and processor-executable instructions stored in the memory and executable by at least one of the processors to instruct the system to: receive data associated with a drilling operation in a geologic environment; determine a state based at least in part on the data; represent the state using a symbolic representation scheme that comprises letters; store the represented state to a database; and, for a combination of letters that represents a combination of states, perform a search of the database to generate a search result. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
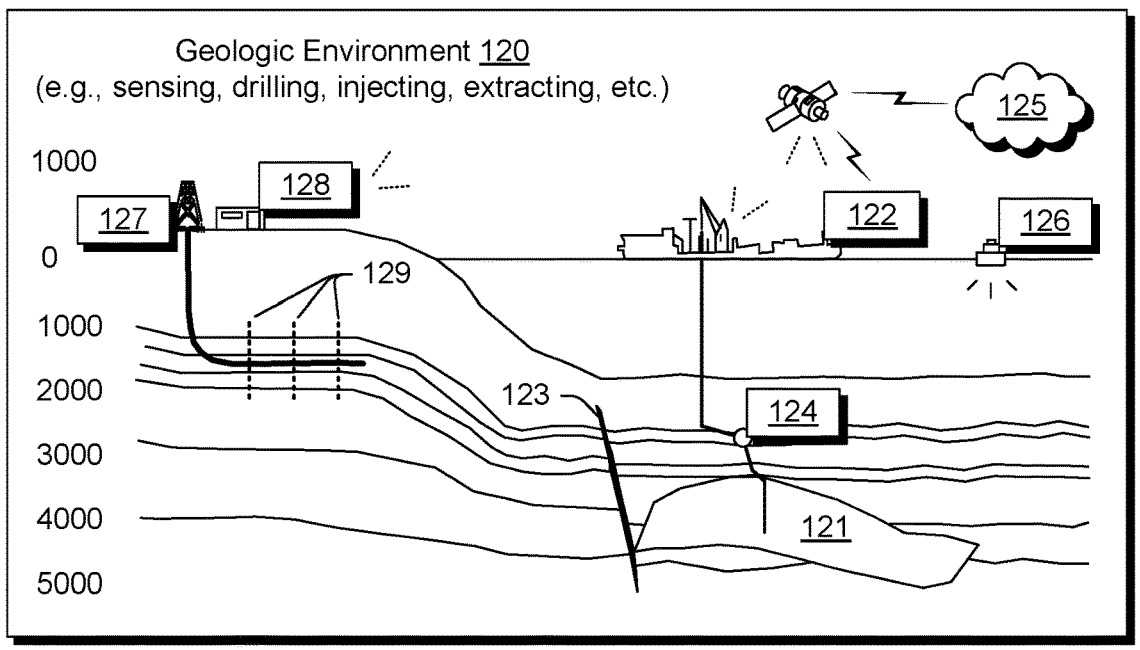
FIG. 1 illustrates examples of equipment in a geologic environment.
Figure 1:
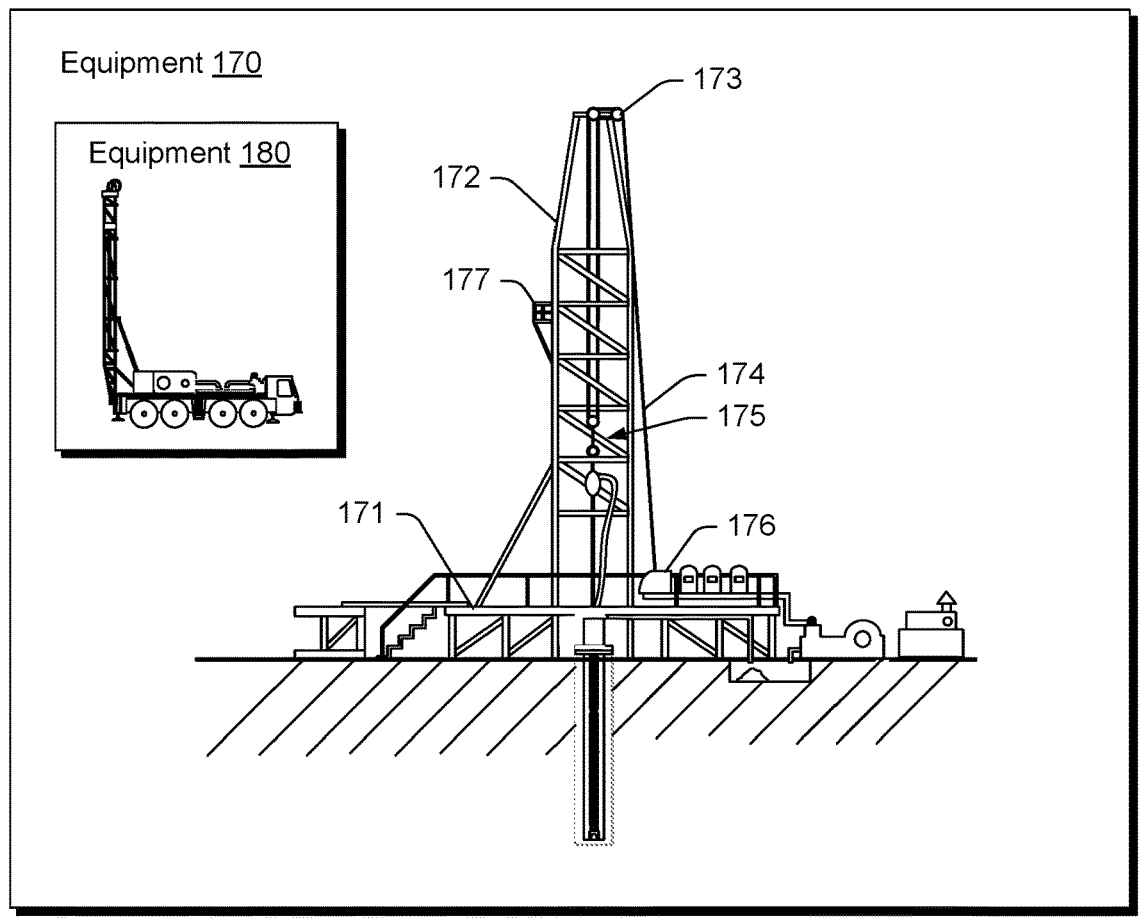

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Well planning is a process by which a path of a well can be mapped, so as to reach a reservoir, for example, to produce fluids therefrom. As an example, constraints can be imposed on a design of a well, for example, a well trajectory may be constrained via one or more physical phenomena that may impact viability of a bore, ease of drilling, etc. Thus, for example, one or more constraints may be imposed based at least in part on known geology of a subterranean domain or, for example, presence of other wells in the area (e.g., collision avoidance). As an example, one or more other constraints may be imposed, for example, consider one or more constraints germane to capabilities of tools being used and/or one or more constraints related to drilling time and risk tolerance.

As an example, a well plan can be generated based at least in part on imposed constraints and known information. As an example, a well plan may be provided to a well owner, approved, and then implemented by a drilling service provider (e.g., a directional driller or "DD"). In such an example, a rig may be used to drill, for example, according to a well plan. During a period of time during which a well plan is implemented, a rig may transition from one state to another state, which may be referred to as rigstates. As an example, a state may be a drilling state or may be a state where drilling into a formation (e.g., rock) is not occurring (e.g., an idle state, a tripping-in state, a tripping-out state, etc.).

As an example, a well design system can account for one or more capabilities of a drilling system or drilling systems that may be utilized at a wellsite. As an example, a drilling engineer may be called upon to take such capabilities into account, for example, as one or more of various designs and specifications are created. As an example, a state such as a rigstate may correspond to a capability, for example, while the capability is being utilized.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

As an example, states such as rigstates may be utilized in planning, implementation, diagnostics, automation, etc. For example, state information may be acquired and stored and/or analyzed. In such an example, analysis of state information may allow for making determinations as to whether a plan is being adequately followed, equipment is operating as expected, etc.

As an example, a database or databases may store state information. As an example, a search engine may be utilized to identify one or more states. For example, consider a query that is a series of two or more states that may have occurred during implementation of a well plan where the search engine may search a database to identify other occurrences of the two or more states. As an example, a match algorithm may find exact and/or approximate occurrences of states responsive to a search.

As an example, states may be represented by symbols. As an example, consider characters as symbols, which may be or include text characters. For example, alphanumeric characters may be utilized to represent a plurality of different states, which can be or include rigstates. In such an example, a search engine may be an alphanumeric search engine that can perform searches of stored information (e.g., indexed information, etc.) using queries, which may be alphanumeric representations of length one or more. In such an example, wildcards, etc. may be utilized, as may be features of an alphanumeric search engine.

As an example, individual states may be represented by one or more corresponding letters. As an example, uppercase and lowercase letters may be utilized. As an example, one or more other characteristics may be utilized to distinguish one letter from another letter. As an example, ASCII codes may be utilized and/or characters associated with or defined by ASCII codes. For example, consider codes 20hex to 7Ehex, known as the printable characters, represent letters, digits, punctuation marks, and a few miscellaneous symbols (noting that ASCII can include 95 printable characters).

As an example, consider a symbolic representation scheme that include letters such as, for example, 26 letters that may optionally be further classified as upper case or lower case. For example, consider the modern English alphabet, which is a Latin alphabet of 26 letters (each having an uppercase and a lowercase form). Such letters are found in the ISO basic Latin alphabet (e.g., consider upper case letters: A B C D E F G H I J K L M N O P Q R S T U V W X Y Z).

As an example, a state-based system may implement one or more Symbolic Aggregate ApproXimation (SAX) representations. For example, SAX can be utilized to represent information that may be in a time series. As an example, a SAX approach may be utilized in a depth series, a length of trajectory series and/or a time series. For example, a rigstate may correspond to a depth into the earth from a surface or other reference location (e.g., a depth series), a length along a trajectory of a piece of equipment (e.g., a trajectory dimension or length series) and/or a time during performance of various field operations (e.g., a time series).

Various examples of types of environments, various examples of types of equipment and various examples of types of methods, operations, etc. are described below. Various examples of state systems, state system methods, etc. are also described, which may be utilized in one or more of the environments, for one or more types of equipment, for one or more types of methods, operations, etc.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
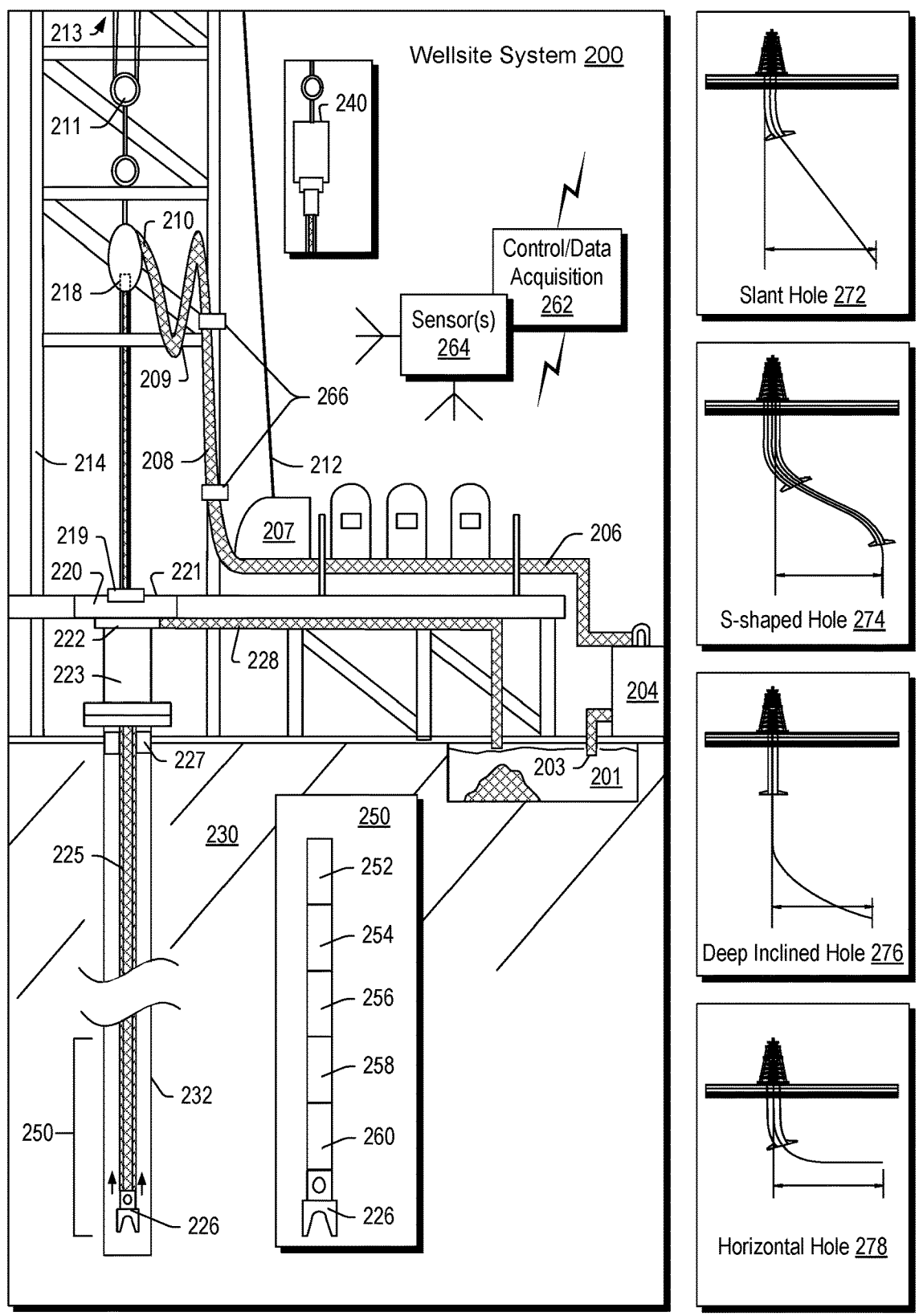
FIG. 2 illustrates an example of a system and examples of types of holes.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
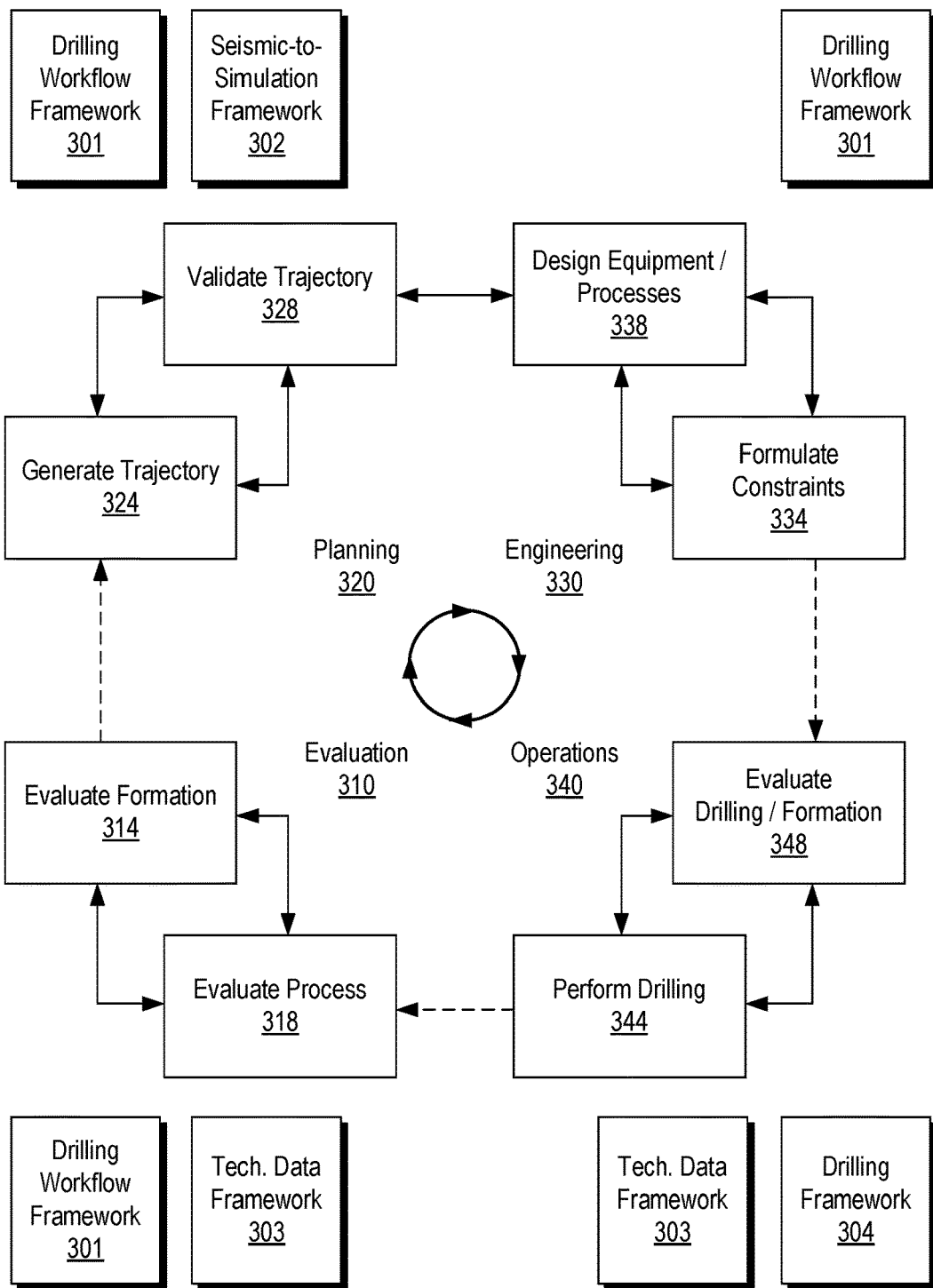
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Tex.) and the technical data framework 303 can be, for example, the TECHLOG® framework (Schlumberger Limited, Houston, Tex.).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on pre-defined classes, for example, to facilitate modeling, analysis, simulation, etc. A commercially available example of an object-based framework is the MICROSOFT™ .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Tex.), the INTERSECT® reservoir simulator (Schlumberger Limited, Houston Tex.), etc.

The aforementioned PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be inter-operative and/or run upon one or another. As an example, consider the commercially available framework environment marketed as the OCEAN® framework environment (Schlumberger Limited, Houston, Tex.), which allows for integration of add-ons (or plug-ins) into a PETREL® framework workflow. The OCEAN® framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the commercially available OCEAN® framework where the model simulation layer can include or operatively link to the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

As an example, the model simulation layer may provide domain objects, act as a data source, provide for rendering and provide for various user interfaces. Rendering may provide a graphical environment in which applications can display their data while the user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA® framework, marketed by Schlumberger Limited, Houston, Tex.) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL® framework, etc.).

As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Figure 4:
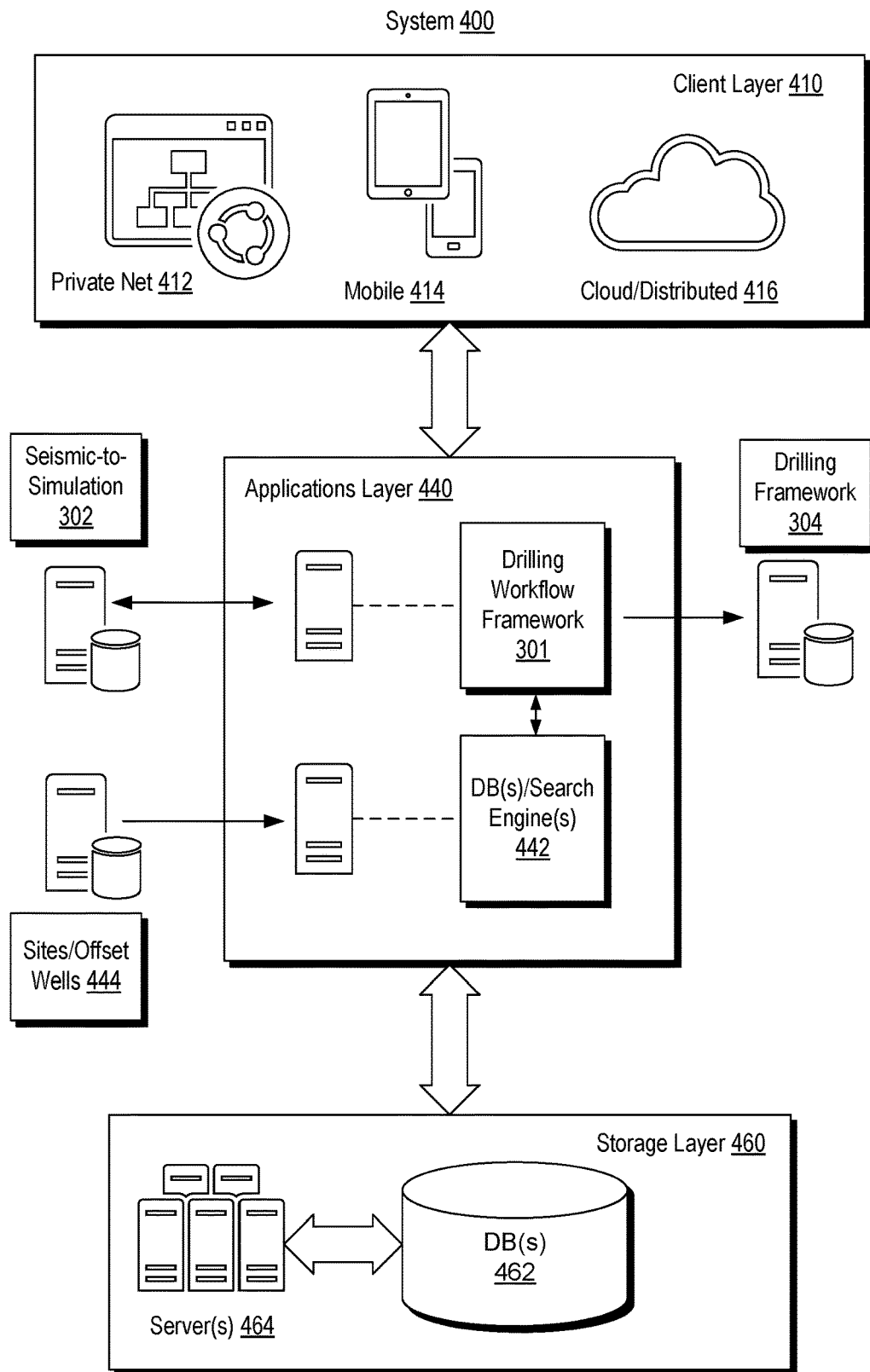
FIG. 4 illustrates an example of a system.

FIG. 4 shows an example of a system 400 that includes a client layer 410, an applications layer 440 and a storage layer 460. As shown the client layer 410 can be in communication with the applications layer 440 and the applications layer 440 can be in communication with the storage layer 460.

The client layer 410 can include features that allow for access and interactions via one or more private networks 412, one or more mobile platforms and/or mobile networks 414 and via the "cloud" 416, which may be considered to include distributed equipment that forms a network such as a network of networks.

In the example of FIG. 4, the applications layer 440 includes the drilling workflow framework 301 as mentioned with respect to the example of FIG. 3. The applications layer 440 also includes a database management component 442 that includes one or more search engines modules.

As an example, the database management component 442 can include one or more search engine modules that provide for searching one or more information that may be stored in one or more data repositories. As an example, the STUDIO E&P™ knowledge environment (Schlumberger Ltd., Houston, Tex.) includes STUDIO FIND™ search functionality, which provides a search engine. The STUDIO FIND™ search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND™ search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 4, the applications layer 440 can include communicating with one or more resources such as, for example, the seismic-to-simulation framework 302, the drilling framework 304 and/or one or more sites, which may be or include one or more offset wellsites. As an example, the applications layer 440 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 4, the storage layer 460 can include various types of data, information, etc., which may be stored in one or more databases 462. As an example, one or more servers 464 may provide for management, access, etc., to data, information, etc., stored in the one or more databases 462. As an example, the module 442 may provide for searching as to data, information, etc., stored in the one or more databases 462.

As an example, the module 442 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 400 of FIG. 4 may be implemented to perform one or more portions of one or more workflows associated with the system 300 of FIG. 3. For example, the drilling workflow framework 301 may interact with the technical data framework 303 and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

Figure 5:
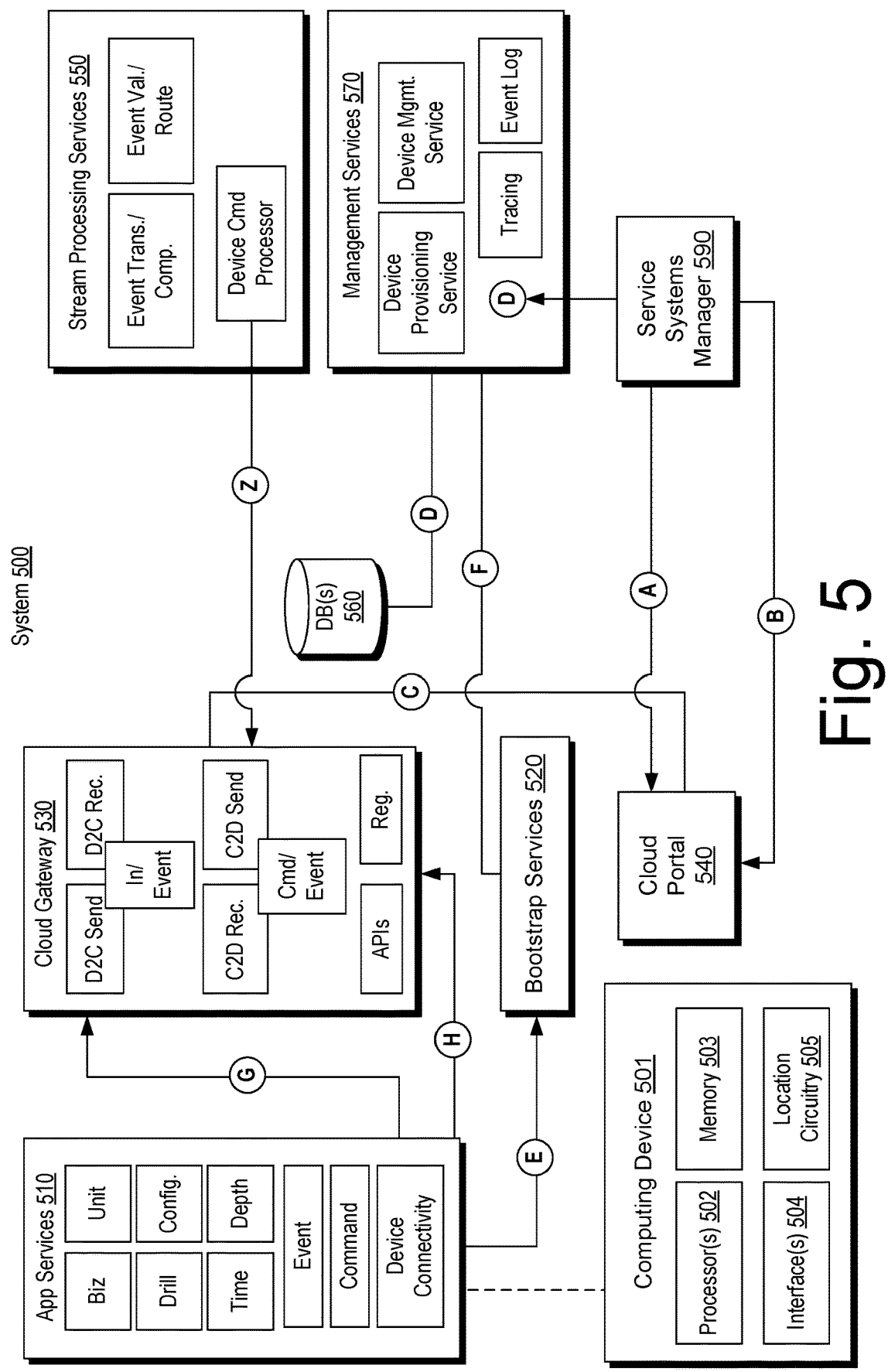
FIG. 5 illustrates an example of a system.

FIG. 5 shows an example of a system 500 that includes a computing device 501, an application services block 510, a bootstrap services block 520, a cloud gateway block 530, a cloud portal block 540, a stream processing services block 550, one or more databases 560, a management services block 570 and a service systems manager 590.

In the example of FIG. 5, the computing device 501 can include one or more processors 502, memory 503, one or more interfaces 504 and location circuitry 505 or, for example, one of the one or more interfaces 504 may be operatively coupled to location circuitry that can acquire local location information. For example, the computing device 501 can include GPS circuitry as location circuitry such that the approximate location of the computer device 501 can be determined. While GPS is mentioned (Global Positioning System), location circuitry may employ one or more types of locating techniques. For example, consider one or more of GLONASS, GALILEO, BeiDou-2, or another system (e.g., global navigation satellite system, "GNSS"). As an example, location circuitry may include cellular phone circuitry (e.g., LTE, 3G, 4G, etc.). As an example, location circuitry may include WiFi circuitry.

As an example, the application services block 510 can be implemented via instructions executable using the computing device 501. As an example, the computing device 501 may be at a wellsite and part of wellsite equipment. As an example, the computing device 501 may be a mobile computing device (e.g., tablet, laptop, etc.) or a desktop computing device that may be mobile, for example, as part of wellsite equipment (e.g., doghouse equipment, rig equipment, vehicle equipment, etc.).

As an example, the system 500 can include performing various actions. For example, the system 500 may include a token that is utilized as a security measure to assure that information (e.g., data) is associated with appropriate permission or permissions for transmission, storage, access, etc.

In the example of FIG. 5, various circles are shown with labels A to H. As an example, A can be a process where an administrator creates a shared access policy (e.g., manually, via an API, etc.); B can be a process for allocating a shared access key for a device identifier (e.g., a device ID), which may be performed manually, via an API, etc.); C can be a process for creating a "device" that can be registered in a device registry and for allocating a symmetric key; D can be a process for persisting metadata where such metadata may be associated with a wellsite identifier (e.g., a well ID) and where, for example, location information (e.g., GPS based information, etc.) may be associated with a device ID and a well ID; E can be a process where a bootstrap message passes that includes a device ID (e.g., a trusted platform module (TPM) chip ID that may be embedded within a device) and that includes a well ID and location information such that bootstrap services (e.g., of the bootstrap services block 520) can proceed to obtain shared access signature (SAS) key(s) to a cloud service endpoint for authorization; F can be a process for provisioning a device, for example, if not already provisioned, where, for example, the process can include returning device keys and endpoint; G can be a process for getting a SAS token using an identifier and a key; and H can be a process that includes being ready to send a message using device credentials. Also shown in FIG. 5 is a process for getting a token and issuing a command for a well identifier (see label Z).

As an example, Shared Access Signatures can be an authentication mechanism based on, for example, SHA-256 secure hashes, URIs, etc. As an example, SAS may be used by one or more Service Bus services. SAS can be implemented via a Shared Access Policy and a Shared Access Signature, which may be referred to as a token. As an example, for SAS applications using the AZURE™ .NET SDK with the Service Bus, .NET libraries can use SAS authorization through the SharedAccessSignatureTokenProvider class.

As an example, where a system gives an entity (e.g., a sender, a client, etc.) a SAS token, that entity does not have the key directly, and that entity cannot reverse the hash to obtain it. As such, there is control over what that entity can access and, for example, for how long access may exist. As an example, in SAS, for a change of the primary key in the policy, Shared Access Signatures created from it will be invalidated.

As an example, the system 500 of FIG. 5 can be implemented for provisioning of rig acquisition system and/or data delivery.

As an example, a method can include establishing an Internet of Things (IoT) hub or hubs. As an example, such a hub or hubs can include one or more device registries. In such an example, the hub or hubs may provide for storage of metadata associated with a device and, for example, a per-device authentication model. As an example, where location information indicates that a device (e.g., wellsite equipment, etc.) has been changed with respect to its location, a method can include revoking the device in a hub.

As an example, an architecture utilized in a system such as, for example, the system 500, may include features of the AZURE™ architecture (Microsoft Corporation, Redmond, Wash.). As an example, the cloud portal block 540 can include one or more features of an AZURE™ portal that can manage, mediate, etc. access to one or more services, data, connections, networks, devices, etc.

As an example, the system 500 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 6:
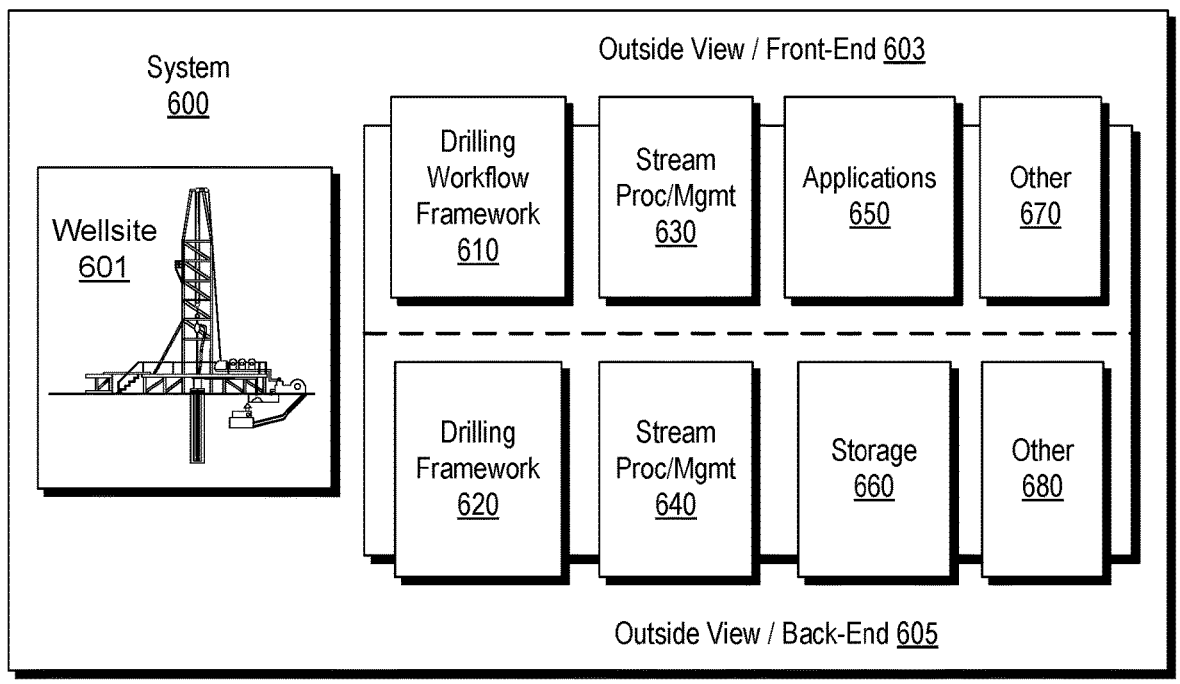
FIG. 6 illustrates an example of a system and an example of a scenario.
Figure 6:
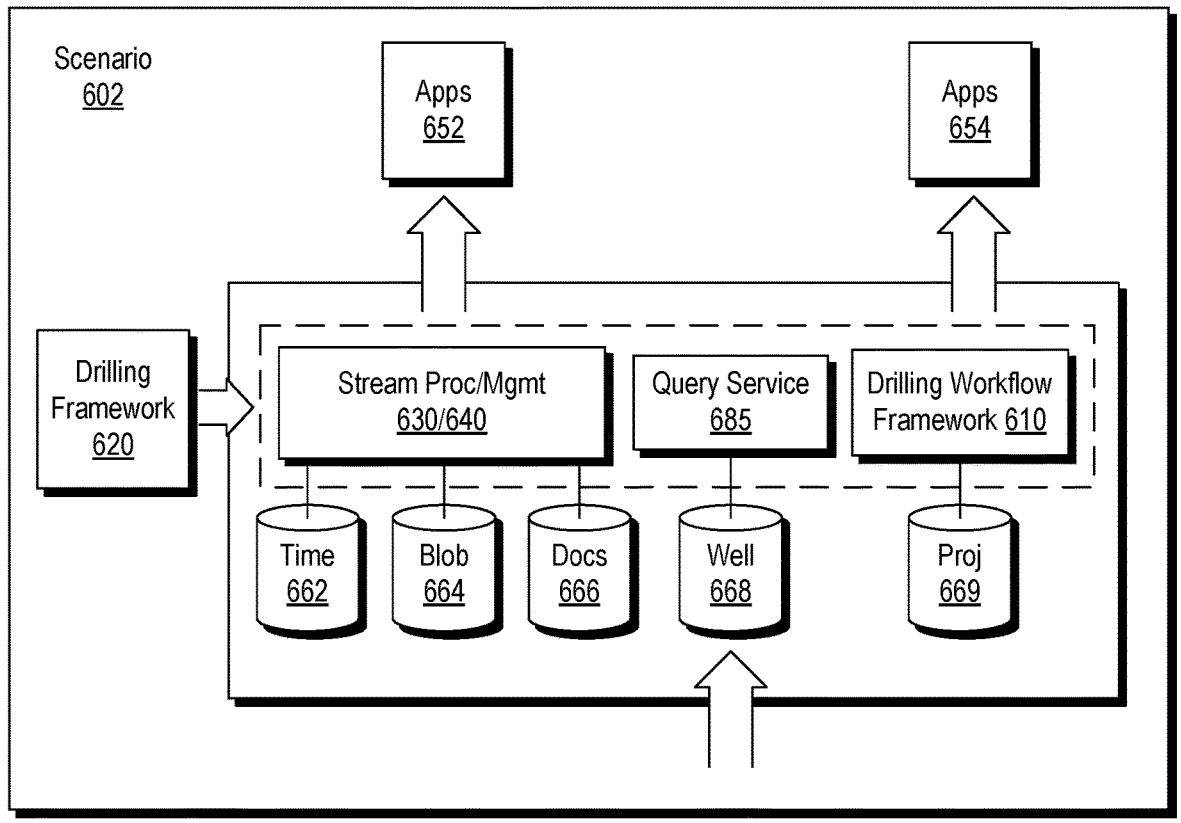

FIG. 6 shows an example of a system 600 associated with an example of a wellsite system 601 and also shows an example scenario 602. As shown in FIG. 6, the system 600 can include a front-end 603 and a back-end 605 from an outside or external perspective (e.g., external to the wellsite system 601, etc.). In the example of FIG. 6, the system 600 includes a drilling framework 620, a stream processing and/or management block 640, storage 660 and optionally one or more other features that can be defined as being back-end features. In the example of FIG. 6, the system 600 includes a drilling workflow framework 610, a stream processing and/or management block 630, applications 650 and optionally one or more other features that can be defined as being front-end features.

As an example, a user operating a user device can interact with the front-end 603 where the front-end 603 can interact with one or more features of the back-end 605. As an example, such interactions may be implemented via one or more networks, which may be associated with a cloud platform (e.g., cloud resources, etc.).

As to the example scenario 602, the drilling framework 620 can provide information associated with, for example, the wellsite system 601. As shown, the stream blocks 630 and 640, a query service 685 and the drilling workflow framework 610 may receive information and direct such information to storage, which may include a time series database 662, a blob storage database 664, a document database 666, a well information database 668, a project(s) database 669, etc. As an example, the well information database 668 may receive and store information such as, for example, customer information (e.g., from entities that may be owners of rights at a wellsite, service providers at a wellsite, etc.). As an example, the project database 669 can include information from a plurality of projects where a project may be, for example, a wellsite project.

As an example, the system 600 can be operable for a plurality of wellsites, which may include active and/or inactive wellsites and/or, for example, one or more planned wellsites. As an example, the system 600 can include various components of the system 300 of FIG. 3. As an example, the system 600 can include various components of the system 400 of FIG. 4. For example, the drilling workflow framework 610 can be a drilling workflow framework such as the drilling workflow framework 301 and/or, for example, the drilling framework 620 can be a drilling framework such as the drilling framework 304.

Figure 7:
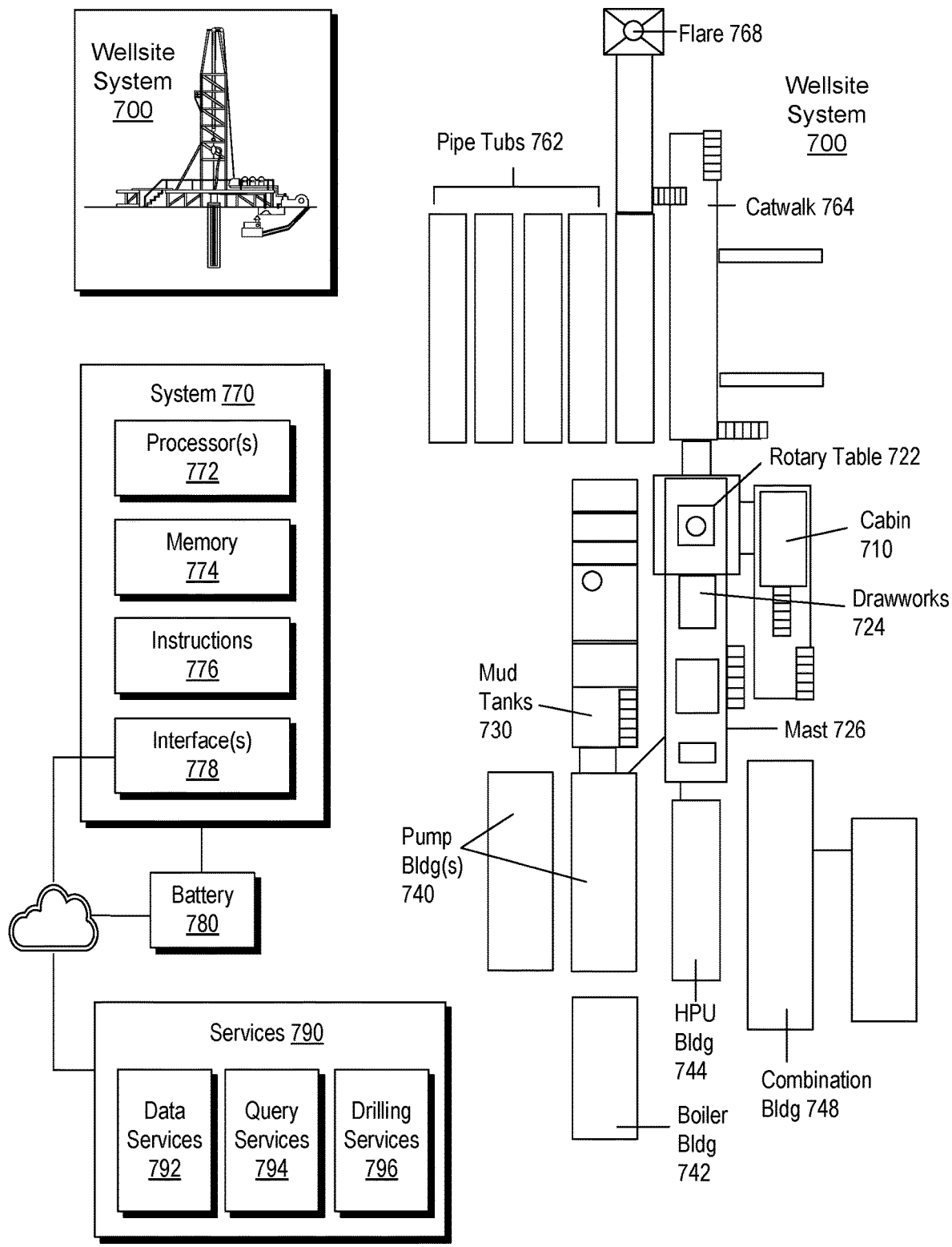
FIG. 7 illustrates an example of a wellsite system.

FIG. 7 shows an example of a wellsite system 700, specifically, FIG. 7 shows the wellsite system 700 in an approximate side view and an approximate plan view along with a block diagram of a system 770.

In the example of FIG. 7, the wellsite system 700 can include a cabin 710, a rotary table 722, drawworks 724, a mast 726 (e.g., optionally carrying a top drive, etc.), mud tanks 730 (e.g., with one or more pumps, one or more shakers, etc.), one or more pump buildings 740, a boiler building 742, an HPU building 744 (e.g., with a rig fuel tank, etc.), a combination building 748 (e.g., with one or more generators, etc.), pipe tubs 762, a catwalk 764, a flare 768, etc. Such equipment can include one or more associated functions and/or one or more associated operational risks, which may be risks as to time, resources, and/or humans.

As shown in the example of FIG. 7, the wellsite system 700 can include a system 770 that includes one or more processors 772, memory 774 operatively coupled to at least one of the one or more processors 772, instructions 776 that can be, for example, stored in the memory 774, and one or more interfaces 778. As an example, the system 770 can include one or more processor-readable media that include processor-executable instructions executable by at least one of the one or more processors 772 to cause the system 770 to control one or more aspects of the wellsite system 700. In such an example, the memory 774 can be or include the one or more processor-readable media where the processor-executable instructions can be or include instructions. As an example, a processor-readable medium can be a computer-readable storage medium that is not a signal and that is not a carrier wave.

FIG. 7 also shows a battery 780 that may be operatively coupled to the system 770, for example, to power the system 770. As an example, the battery 780 may be a back-up battery that operates when another power supply is unavailable for powering the system 770. As an example, the battery 780 may be operatively coupled to a network, which may be a cloud network. As an example, the battery 780 can include smart battery circuitry and may be operatively coupled to one or more pieces of equipment via a SMBus or other type of bus.

In the example of FIG. 7, services 790 are shown as being available, for example, via a cloud platform. Such services can include data services 792, query services 794 and drilling services 796. As an example, the services 790 may be part of a system such as the system 300 of FIG. 3, the system 400 of FIG. 4 and/or the system 600 of FIG. 6.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, one or more systems can be utilized to implement a workflow that can be performed collaboratively. As an example, the system 300 of FIG. 3 can be operated as a distributed, collaborative well-planning system. The system 300 can utilize one or more servers, one or more client devices, etc. and may maintain one or more databases, data files, etc., which may be accessed and modified by one or more client devices, for example, using a web browser, remote terminal, etc. As an example, a client device may modify a database or data files on-the-fly, and/or may include "sandboxes" that may permit one or more client devices to modify at least a portion of a database or data files optionally off-line, for example, without affecting a database or data files seen by one or more other client devices. As an example, a client device that includes a sandbox may modify a database or data file after completing an activity in the sandbox.

In some examples, client devices and/or servers may be remote with respect to one another and/or may individually include two or more remote processing units. As an example, two systems can be "remote" with respect to one another if they are not physically proximate to one another; for example, two devices that are located at different sides of a room, in different rooms, in different buildings, in different cities, countries, etc. may be considered "remote" depending on the context. In some embodiments, two or more client devices may be proximate to one another, and/or one or more client devices and a server may be proximate to one another.

As an example, various aspects of a workflow may be completed automatically, may be partially automated, or may be completed manually, as by a human user interfacing with a software application. As an example, a workflow may be cyclic, and may include, as an example, four stages such as, for example, an evaluation stage (see, e.g., the evaluation equipment 310), a planning stage (see, e.g., the planning equipment 320), an engineering stage (see, e.g., the engineering equipment 330) and an execution stage (see, e.g., the operations equipment 340). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 314). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 324), which may involve execution of one or more G&G software packages. Examples of such software packages include the PETREL® framework. As an example, a G&G service provider may determine a well trajectory or a section thereof, based on, for example, one or more model(s) provided by a formation evaluation (e.g., per the evaluation block 314), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 328). Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory (see, e.g., the design block 338). In some embodiments, a second engineering service provider may perform such design using one of more software applications. Such designs may be stored in one or more databases maintained by one or more servers, which may, for example, employ STUDIO® framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 334). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 344 and 348). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 318). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As an example, a system can allow for a reduction in waste, for example, as may be defined according to LEAN. In the context of LEAN, consider one or more of the following types of waste: Transport (e.g., moving items unnecessarily, whether physical or data); Inventory (e.g., components, whether physical or informational, as work in process, and finished product not being processed); Motion (e.g., people or equipment moving or walking unnecessarily to perform desired processing); Waiting (e.g., waiting for information, interruptions of production during shift change, etc.); Overproduction (e.g., production of material, information, equipment, etc. ahead of demand); Over Processing (e.g., resulting from poor tool or product design creating activity); and Defects (e.g., effort involved in inspecting for and fixing defects whether in a plan, data, equipment, etc.). As an example, a system that allows for actions (e.g., methods, workflows, etc.) to be performed in a collaborative manner can help to reduce one or more types of waste.

As an example, a system can be utilized to implement a method for facilitating distributed well engineering, planning, and/or drilling system design across multiple computation devices where collaboration can occur among various different users (e.g., some being local, some being remote, some being mobile, etc.). In such a system, the various users via appropriate devices may be operatively coupled via one or more networks (e.g., local and/or wide area networks, public and/or private networks, land-based, marine-based and/or areal networks, etc.).

As an example, a system may allow well engineering, planning, and/or drilling system design to take place via a subsystems approach where a wellsite system is composed of various subsystem, which can include equipment subsystems and/or operational subsystems (e.g., control subsystems, etc.). As an example, computations may be performed using various computational platforms/devices that are operatively coupled via communication links (e.g., network links, etc.). As an example, one or more links may be operatively coupled to a common database (e.g., a server site, etc.). As an example, a particular server or servers may manage receipt of notifications from one or more devices and/or issuance of notifications to one or more devices. As an example, a system may be implemented for a project where the system can output a well plan, for example, as a digital well plan, a paper well plan, a digital and paper well plan, etc. Such a well plan can be a complete well engineering plan or design for the particular project.

Figure 8:
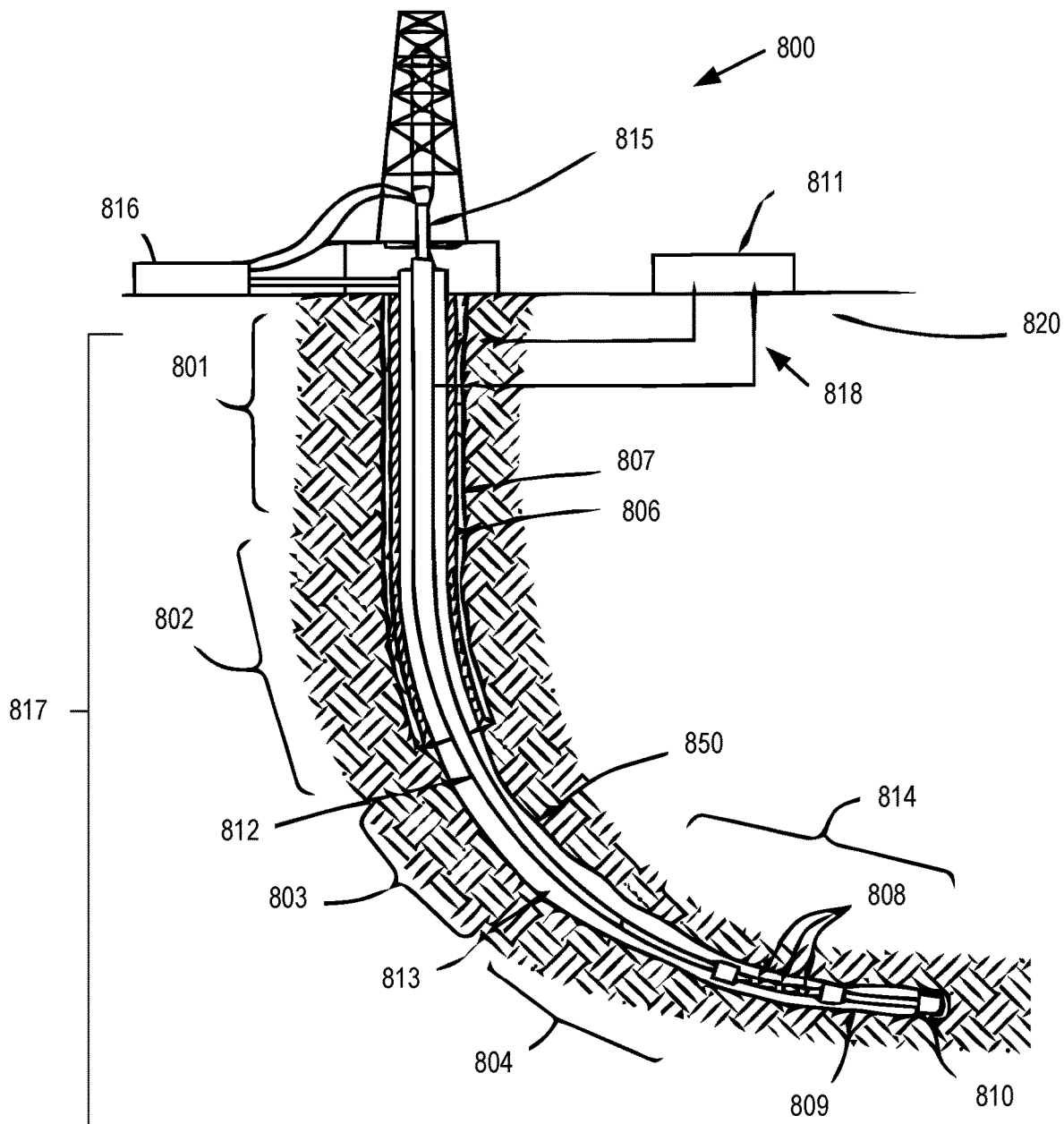
FIG. 8 illustrates an example of a system.

FIG. 8 shows a schematic diagram depicting an example of a drilling operation of a directional well in multiple sections. The drilling operation depicted in FIG. 8 includes a wellsite drilling system 800 and a field management tool 820 for managing various operations associated with drilling a bore hole 850 of a directional well 817. The wellsite drilling system 800 includes various components (e.g., drillstring 812, annulus 813, bottom hole assembly (BHA) 814, kelly 815, mud pit 816, etc.). As shown in the example of FIG. 8, a target reservoir may be located away from (as opposed to directly under) the surface location of the well 817. In such an example, special tools or techniques may be used to ensure that the path along the bore hole 850 reaches the particular location of the target reservoir.

As an example, the BHA 814 may include sensors 808, a rotary steerable system 809, and a bit 810 to direct the drilling toward the target guided by a pre-determined survey program for measuring location details in the well. Furthermore, the subterranean formation through which the directional well 817 is drilled may include multiple layers (not shown) with varying compositions, geophysical characteristics, and geological conditions. Both the drilling planning during the well design stage and the actual drilling according to the drilling plan in the drilling stage may be performed in multiple sections (e.g., sections 801, 802, 803 and 804) corresponding to the multiple layers in the subterranean formation. For example, certain sections (e.g., sections 801 and 802) may use cement 807 reinforced casing 806 due to the particular formation compositions, geophysical characteristics, and geological conditions.

In the example of FIG. 8, a surface unit 811 may be operatively linked to the wellsite drilling system 800 and the field management tool 820 via communication links 818. The surface unit 811 may be configured with functionalities to control and monitor the drilling activities by sections in real-time via the communication links 818. The field management tool 820 may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link 818 according to a drilling operation workflow. The communication links 818 may include a communication subassembly.

During various operations at a wellsite, data can be acquired for analysis and/or monitoring of one or more operations. Such data may include, for example, subterranean formation, equipment, historical and/or other data. Static data can relate to, for example, formation structure and geological stratigraphy that define the geological structures of the subterranean formation. Static data may also include data about a bore, such as inside diameters, outside diameters, and depths. Dynamic data can relate to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected via a bore, a formation, equipment, etc. may be used to create and/or update a three dimensional model of one or more subsurface formations. As an example, static and dynamic data from one or more other bores, fields, etc. may be used to create and/or update a three dimensional model. As an example, hardware sensors, core sampling, and well logging techniques may be used to collect data. As an example, static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once a well is formed and completed, depending on the purpose of the well (e.g., injection and/or production), fluid may flow to the surface (e.g., and/or from the surface) using tubing and other completion equipment. As fluid passes, various dynamic measurements, such as fluid flow rates, pressure, and composition may be monitored. These parameters may be used to determine various characteristics of a subterranean formation, downhole equipment, downhole operations, etc.

Figure 9:
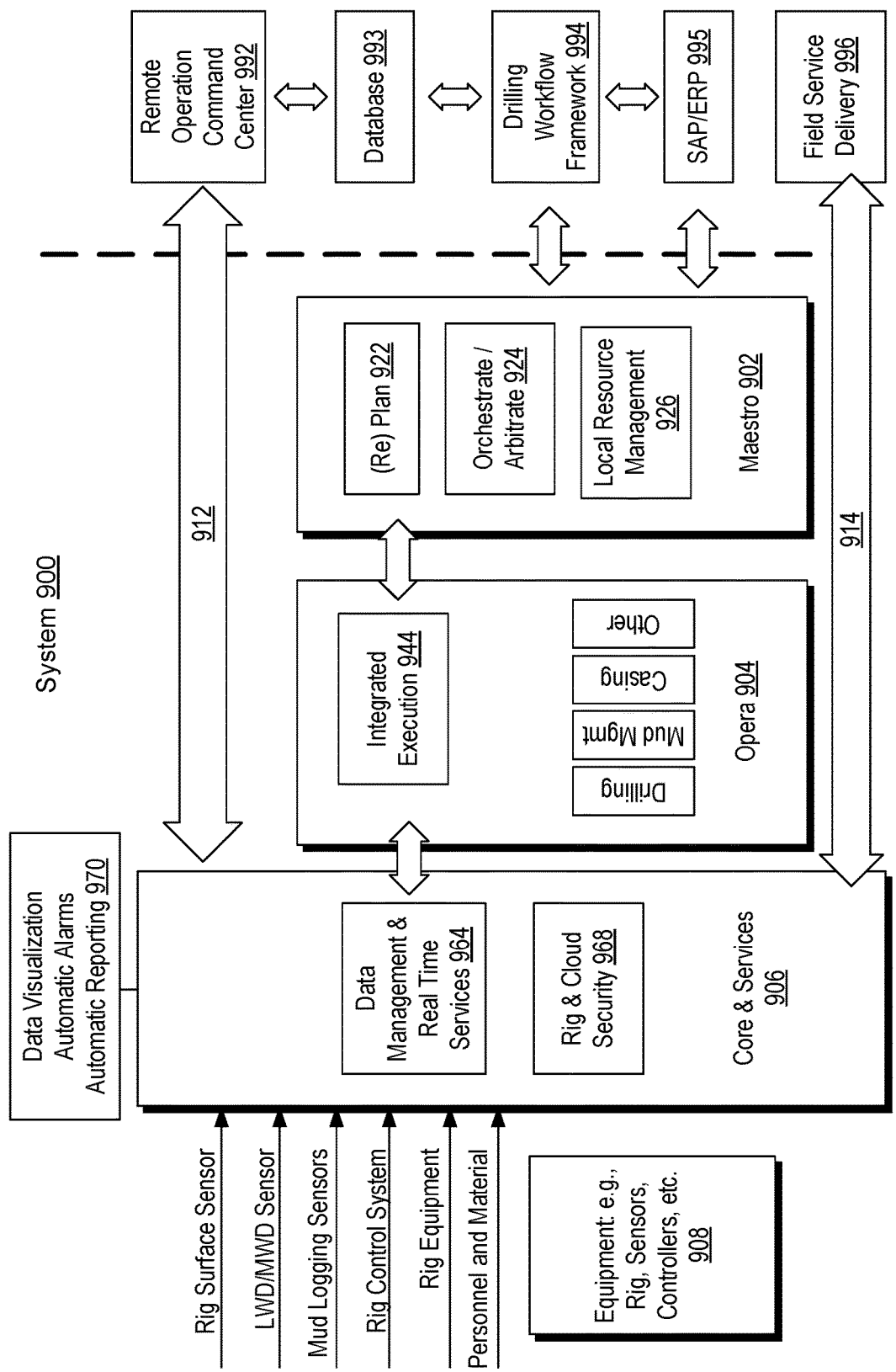
FIG. 9 illustrates an example of a system.

FIG. 9 shows an example of a system 900 that includes various components that can be local to a wellsite and includes various components that can be remote from a wellsite. As shown, the system 900 includes a block 902, a block 904, a block 906 and an equipment block 908. These blocks can be labeled in one or more manners other than as shown in the example of FIG. 9. In the example of FIG. 9, the blocks 902, 904, 906 and 908 can be defined by one or more of operational features, functions, relationships in an architecture, etc.

As an example, the block 902 can be associated with a well management level (e.g., well planning and/or orchestration) and can be associated with a rig management level (e.g., rig dynamic planning and/or orchestration). As an example, the block 904 can be associated with a process management level (e.g., rig integrated execution). As an example, the block 906 can be associated with a data management level (e.g., sensor, instrumentation, inventory, etc.). As an example, the equipment block 908 can be associated with a wellsite equipment level (e.g., wellsite subsystems, etc.).

In the example of FIG. 9, the block 902 includes a plan/replan block 922, an orchestrate/arbitrate block 924 and a local resource management block 926. In the example of FIG. 9, the block 904 includes an integrated execution block 944, which can include or be operatively coupled to blocks for various subsystems of a wellsite such as a drilling subsystem, a mud management subsystem (e.g., a hydraulics subsystem), a casing subsystem (e.g., casings and/or completions subsystem), and, for example, one or more other subsystems. In the example of FIG. 9, the block 906 includes a data management and real-time services block 964 (e.g., real-time or near real-time services) and a rig and cloud security block 968. In the example of FIG. 9, the equipment block 908 is shown as being capable of providing various types of information to the block 906. For example, consider information from a rig surface sensor, a LWD/MWD sensor, a mud logging sensor, a rig control system, rig equipment, personnel, material, etc. In the example, of FIG. 9, a block 970 can provide for one or more of data visualization, automatic alarms, automatic reporting, etc. As an example, the block 970 may be operatively coupled to the block 906 and/or one or more other blocks.

As mentioned, a portion of the system 900 can be remote from a wellsite. For example, to one side of a dashed line appear a remote operation command center block 992, a database block 993, a drilling workflow framework block 994, a SAP/ERP block 995 and a field services delivery block 996. Various blocks that may be remote can be operatively coupled to one or more blocks that may be local to a wellsite system. For example, a communication link 912 is illustrated in the example of FIG. 9 that can operatively couple the blocks 906 and 992 (e.g., as to monitoring, remote control, etc.), while another communication link 914 is illustrated in the example of FIG. 9 that can operatively couple the blocks 906 and 996 (e.g., as to equipment delivery, equipment services, etc.). Various other examples of possible communication links are also illustrated in the example of FIG. 9.

In the example of FIG. 9, various blocks can be components that may correspond to one or more software instruction sets (e.g., processor-executable instructions, add-ons, plug-ins, etc.), hardware infrastructure, firmware, equipment, or a combination thereof. Communication between the components may be local or remote, direct or indirect, via application programming interfaces, and procedure calls, or through one or more communication channels.

As an example, the block 906 (e.g., a core services block) can include functionality to manage individual pieces of equipment and/or equipment subsystems. As an example, such a block can include functionality to handle basic data structure of the oilfield, such as the rig, acquire metric data, produce reports, and manages resources of people and supplies. As an example, such a block may include a data acquirer and aggregator, a rig state identifier, a real-time (RT) drill services (e.g., near real-time), a reporter, a cloud, and an inventory manager.

As an example, a data acquirer and aggregator can include functionality to interface with individual equipment components (e.g., one or more sensors) and acquire data. As an example, a data acquirer and aggregator may further include functionality to interface with sensors located at an oilfield.

As an example, a rig state identifier can includes functionality to obtain data from the data acquirer and aggregator and transform the data into state information. As an example, state information may include health and operability of a rig as well as information about a particular task being performed by equipment.

As an example, RT drill services can include functionality to transmit and present information to individuals. In particular, the RT drill services can include functionality to transmit information to individuals involved according to roles and, for example, device types of each individual (e.g., mobile computing device, desktop computing device, etc.). In one or more embodiments, information presented by RT drill services can be context specific, and may include a dynamic display of information so that a human user may view details about items of interest.

As an example, a wellsite "cloud" framework can correspond to an information technology infrastructure locally at an oilfield, such as an individual rig in the oilfield. In such an example, the wellsite "cloud" framework may be an "Internet of Things" (IoT) framework. As an example, a wellsite "cloud" framework can be an edge of the cloud (e.g., a network of networks) or of a private network.

In the example of FIG. 9, the equipment block 908 can correspond to various controllers, control unit, control equipment, etc. that may be operatively coupled to and/or embedded into physical equipment at a wellsite such as, for example, rig equipment. For example, the equipment block 908 may correspond to software and control systems for individual items on the rig. As an example, the equipment block 908 may provide for monitoring sensors from multiple subsystems of a drilling rig and provide control commands to multiple subsystem of the drilling rig, such that sensor data from multiple subsystems may be used to provide control commands to the different subsystems of the drilling rig and/or other devices, etc. For example, a system may collect temporally and depth aligned surface data and downhole data from a drilling rig and transmit the collected data to data acquirers and aggregators in core services, which can store the collected data for access onsite at a drilling rig or offsite via a computing resource environment.

As an example, a system can include a framework that can acquire data such as, for example, real-time data associated with one or more operations such as, for example, a drilling operation or drilling operations. As an example, consider the PERFORM™ toolkit framework (Schlumberger Limited, Houston, Tex.).

As an example, a service can be or include one or more of OPTIDRILL™, OPTILOG™ and/or other services marketed by Schlumberger Limited, Houston, Tex.

The OPTIDRILL™ technology can help to manage downhole conditions and BHA dynamics as a real-time drilling intelligence service. The service can incorporate a rigsite display (e.g., a wellsite display) of integrated downhole and surface data that provides actionable information to mitigate risk and increase efficiency. As an example, such data may be stored, for example, to a database system (e.g., consider a database system associated with the STUDIO™ framework).

The OPTILOG™ technology can help to evaluate drilling system performance with single- or multiple-location measurements of drilling dynamics and internal temperature from a recorder. As an example, post-run data can be analyzed to provide input for future well planning.

As an example, information from a drill bit database may be accessed and utilized. For example, consider information from Smith Bits (Schlumberger Limited, Houston, Tex.), which may include information from various operations (e.g., drilling operations) as associated with various drill bits, drilling conditions, formation types, etc.

As an example, one or more QTRAC services (Schlumberger Limited, Houston Tex.) may be provided for one or more wellsite operations. In such an example, data may be acquired and stored where such data can include time series data that may be received and analyzed, etc.

As an example, one or more M-I SWACO™ services (M-I L.L.C., Houston, Tex.) may be provided for one or more wellsite operations. For example, consider services for value-added completion and reservoir drill-in fluids, additives, cleanup tools, and engineering. In such an example, data may be acquired and stored where such data can include time series data that may be received and analyzed, etc.

As an example, one or more ONE-TRAX™ services (e.g., via the ONE-TRAX software platform, M-I L.L.C., Houston, Tex.) may be provided for one or more wellsite operations. In such an example, data may be acquired and stored where such data can include time series data that may be received and analyzed, etc.

Figure 10:
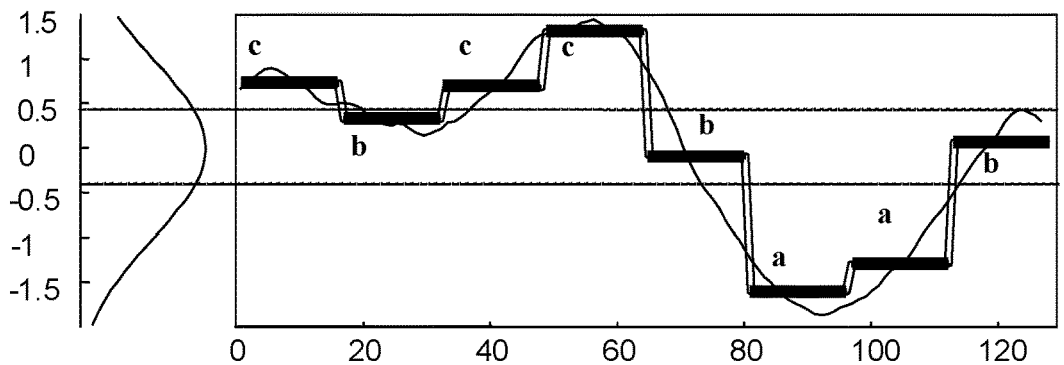
FIG. 10 illustrates an example of an equation, an example of a table, an example of a plot and an example of a representation.

FIG. 10 shows an example of an equation 1010, an example of a table 1030, an example of a plot 1050 and an example of a representation of data 1070 as in the plot 1050. The equation 1010, the table 1030, the plot 1050 and the representation 1070 are associated with a technique referred to as symbolic aggregation approximation (SAX).

As to the equation 1010, a time series C of length n can be represented in a w-dimensional space by a vector $\overline{C}$ where the i-th element of the vector $\overline{C}$ can be calculated via the equation 1010. Such an approach can be used to transform a time series from n dimensions to w-dimensions, for example, where data are divided into w equal sized "frames." The mean value of data falling within a frame can be calculated and a vector of these values becomes the dimensionality reduced representation. Such a representation is known as Piecewise Aggregate Approximation (PAA).

Having transformed a time series into the PAA representation, a transformation can be applied to obtain a discrete representation. As an example, a discretization technique may be utilized that can produce symbols with equiprobability. As an example, normalized subsequences may exhibit a Gaussian distribution such that a system can determine "breakpoints" that produce equal-sized areas under a Gaussian curve.

Breakpoints can be a sorted list of numbers $B=\beta_1, \ldots, \beta_{a-1}$ such that the area under a N(0,1) Gaussian curve from $\beta_i$ to $\beta_{i+1}=1/a$ (e.g., where $\beta_0$ and $\beta_a$ are defined as $-\infty$ and $\infty$, respectively). As an example, these breakpoints may be determined by looking them up in a statistical table. For example, the table 1030 of FIG. 10 gives the breakpoints for values of a from 3 to 5. Such a lookup table includes the breakpoints that divide a Gaussian distribution in an arbitrary number (e.g., from approximately 3 to approximately 5) of equiprobable regions.

As an example, once breakpoints have been obtained, it is possible to discretize a time series in the following manner. First, obtain a PAA of the time series. In such an example, PAA coefficients that are below the smallest breakpoint can be mapped to the symbol "a"; whereas, coefficients greater than or equal to the smallest breakpoint and less than the second smallest breakpoint can be mapped to the symbol "b", etc.

In the plot 1050, a time series (thin black line) is discretized by first obtaining a PAA approximation and then using predetermined breakpoints to map the PAA coefficients into symbols (bold letters). In the example data of the plot 1050, with n=128, w=8 and a=3, the time series is mapped to the word "cbccbaab", which is shown as a representation 1070. Note that in this example, the 3 symbols, "a", "b" and "c" are approximately equiprobable as desired. The concatenation of symbols that represent a subsequence can be referred to as a word (see the representation 1070).

As mentioned, a series may be a depth series (e.g., depth of a physical structure, depth of equipment, etc.), a length along a trajectory series (e.g., a length in a borehole in a geologic environment) and/or a time series (e.g., a series of physical conditions, physical activities, etc., that occur over a period of time). As an example, data may be part of a depth series and a time series. As an example, data may be part of a depth series and a length along a trajectory series. As an example, data may be part of a length along a trajectory series and a time series. As an example, data may correspond to a position of a tool in a borehole where that position may be associated with one or more of a depth, a length along a trajectory or a time. As an example, such data may be state data that is indicative of a state such as, for example, a rigstate. As an example, data and/or states may be represented via one or more features, methods, computations, etc., associated with the symbolic aggregation approximation (SAX) approach described with respect to FIG. 10.

As an example, series data may be represented using SAX. As an example, states may be determined based on series data represented using SAX. For example, time series data associated with drilling may be represented using SAX where certain representations can be indicative and/or determinative of a rigstate. In such an example, a hierarchy of SAX representations may be implemented.

As an example, a system can include a framework that can acquire data such as, for example, real-time data associated with one or more operations such as, for example, a drilling operation or drilling operations. As an example, consider the PERFORM™ toolkit framework (Schlumberger Limited, Houston, Tex.).

As an example, a framework can include a rigstates engine suitable for use in drilling interpretations and/or control of one or more drilling operations (e.g., one or more rig operations). As an example, such an engine may be utilized in combination with a SAX engine and, for example, an analysis engine and/or a search engine.

As an example, a framework-implemented method can include acquiring information associated with physical processes and/or operations associated with drilling into rock, determining rigstates and/or other types of states of physical equipment and/or rock, fluid, etc., and based at least in part on the determined rigstates and/or states, issuing one or more instructions to one or more pieces of equipment (e.g., via one or more network interfaces) to cause the one or more pieces of equipment to operate in a particular manner. For example, if a series of states indicates that a bottom hole assembly (BHA) is at an elevated risk of getting stuck in a borehole, the framework may issue one or more instructions to equipment to reduce the risk of the BHA getting stuck in the borehole. Such instructions may pertain to rotational speed of a top drive, rotational speed of a drill bit, direction of a drill bit, flowrate of fluid (e.g., mud, etc.), etc. For example, a framework may determine from a state-based analysis whether a trajectory deviation of a borehole can be lessened in terms of degrees to reduce risk of a BHA getting stuck in the borehole. In such an example, the framework may issue one or more instructions via one or more network interfaces that instruct equipment (e.g., rig equipment) to reduce deviation of a trajectory (e.g., via steering, etc.) and/or to take one or more other actions such as one or more adjustments to fluid (e.g., fluid pumps, fluid mixers, type of additives that may be added to fluid, etc.), which may help to lubricate equipment as it moves in a borehole.

As an example, a system can provide for post-rigstates processing for one or more purposes related to drilling of a well, completing a well, equipment, human behavior, etc.

Referring again to FIG. 10, the plot 1050 represents a transformation of data that can be acquired via equipment where such a transformation may be part of a workflow, optionally a real-time workflow where decisions are made, instructions issued (e.g., via one or more network interfaces), etc. to control one or more pieces of equipment. As an example, a framework can include receiving data and transforming data to generate transformed data where the transformed data is amenable to analysis by one or more algorithms that can expedite decision making, issuance of instructions, etc.

As an example, a framework can transform sensor data (e.g., raw numeric data) such that the transformed sensor data can be stored to physical memory accessible by a processor (e.g., directly and/or indirectly) in a particular logical form. As an example, numeric data from one or more sensors may be transformed to alphabetic data where the alphabetic data are accessible by a computing device executing a search algorithm that includes alphabetic search logic. Such an approach, when compared to a numeric raw data approach, can expedite decision making and/or control of a rig-based operation or operations as to drilling of a borehole in a geologic environment.

As an example, a framework can aggregate streams (e.g., channels) of sensor data (e.g., streams of raw numeric data) into an alphabetic form where a letter of an alphabet (or alphabets) may represent a state in a state-based approach. Such a state-based approach can model operations as a state machine where individual states can be individual letters.

As an example, a series of letters can represent a series of states that transition from one state to another state of a state machine. In such an example, a logical structure (e.g., as stored in memory) can include a state and one or more times that can be utilized to access a start time, an end time, and/or a duration of the state. As an example, a logical structure may be a "word" that includes two or more letters where each letter represents a state of a state machine (e.g., a rig system, etc.) and where the word represents a transition sequence from at least one state of the state machine to another state of the state machine. As an example, a framework can include one or more hashing algorithms that can generate a hash of a word where the word may be relatively long in length. For example, a word greater than X letters may be hashed where a generated hash is shorter than the X letters. Such an approach may be utilized to expedite searching and/or identifying one or more sequences of transitions of a state machine (e.g., a rig system, rig systems, etc.).

As an example, states may be represented along a time axis where, for example, instances of a state can be plotted at instances in time, which may be discretized. For example, where a state persists for a period of 10 minutes, a plot may include ten markers for the state as representing one minute per marker. As an example, the markers may be plotted in a two-dimensional or higher dimensional plot, for example, along with one or more axes of numeric data (e.g., sensor data, etc.). For example, consider plotting states as markers with an abscissa for time and with an ordinate as to block position (e.g., of a traveling block of a rig). In such an example, the markers can rise and fall with the block position where each marker represents the state of a state machine (e.g., a rig system, including equipment that may be in a borehole).

Figure 11:
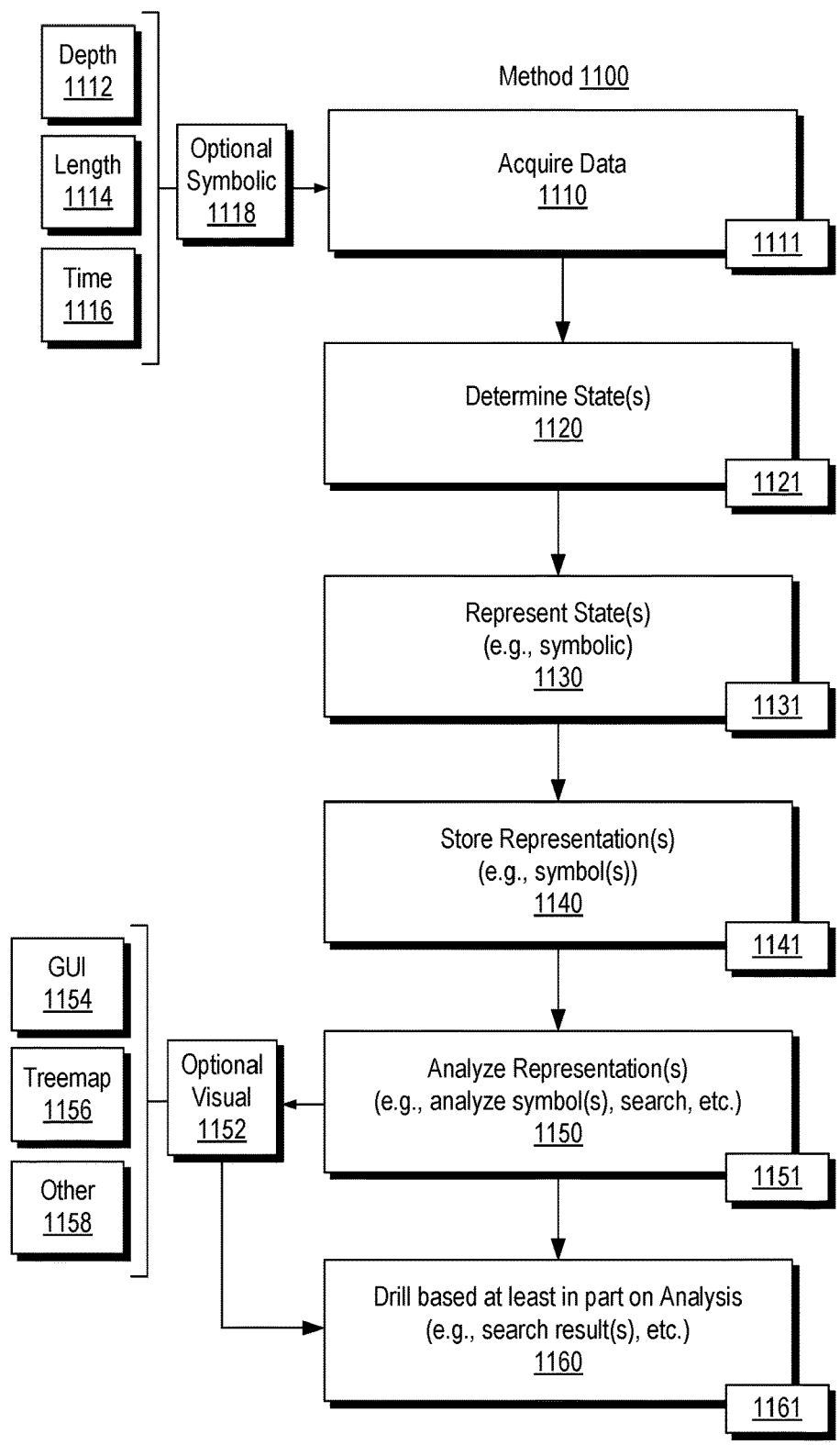
FIG. 11 illustrates an example of a method.

FIG. 11 shows an example of a method 1100 that includes an acquisition block 1110 for acquiring data, a determination block 1120 for determining a state or states based at least in part on the data, a representation block 1130 for representing a state or states (e.g., as symbols, which may be or include letters, etc.), a storage block 1140 for storing one or more representations (e.g., one or more symbols), an analysis block 1150 for analyzing one or more stored representations (e.g., one or more stored symbols) and a drill block 1160 for drilling based at least in part on the analysis.

In the example of FIG. 11, the method 1100 may receive data (e.g., acquire data) such as, for example, depth related data 1112 (e.g., depth series data), length related data 1114 (e.g., length of trajectory series data) and/or time related data 1116 (e.g., time series data). As an example, received data (e.g., acquired data) may optionally be in symbolic form or translated to symbolic form per the optional symbolic block 1118. As an example, a method or workflow can include tiers of symbolic representations. For example, one tier may be a data tier and another tier may be a state tier (e.g., a rigstate tier). As an example, such a method or workflow may implement one or more features of the aforementioned SAX technique (see, e.g., FIG. 10).

In the example of FIG. 11, the method may include rendering one or more visualizations. For example, the analysis block 1150 can include an optional visualization block 1152 where symbols may be represented via one or more GUIs 1154, one or more visualizations such as a treemap, etc. 1156 and/or one or more other types of visualizations 1158.

As an example, a method can include receiving data associated with a drilling operation in a geologic environment; determining a state based at least in part on the data; representing the state using a symbolic representation scheme that includes letters; storing the represented state in a database; and, for a combination of letters that represents a combination of states, performing a search engine based search of the database to generate a search result. In such an example, the symbolic representation scheme that includes letters can be a type of symbolic representation scheme. As an example, a method may further include receiving a search term as an alphabetic string that represents a sequence of state transitions of a state machine (e.g., a rig system) and searching for one or more occurrences of the alphabetic string in stored data. In such an example, the stored data may be associated with a single rig at a single site, may be associated with a single rig utilized at a plurality of sites, may be associated with a plurality of rigs utilized at a plurality of sites, may be associated with a particular piece of equipment utilized at one or more sites, may be associated with a particular operator (e.g., or operational team) that has performed operations at one or more sites, etc.

As an example, a combination of letters can represent a sequence of state transitions. As an example, a search may include one or more other types of search terms. For example, a search term may be associated with a rig, an operator, a site, etc. In such an example, a search may be performed that searches for at least one state (e.g., as a letter) and that searches for one or more aspects associated with states in a database. For example, symbolic states stored as letters in a database can be stored with additional data, which may be, for example, metadata. As an example, symbolic states stored as letters in a database may be stored with links to other data (e.g., rig, site, equipment, operator, etc.).

As an example, a combination of letters can represent an invisible lost time event. As an example, a query may search for one or more invisible lost time events via one or more strings of letters where each of the letters represents a state of a state machine, which may be a rig system.

The method 1100 is shown in FIG. 11 in association with various computer-readable media (CRM) blocks 1111, 1121, 1131, 1141, 1151 and 1161. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1100. As an example, a computer-readable medium (CRM) may be a computer-readable storage medium that is non-transitory and not a carrier wave. As an example, the blocks 1111, 1121, 1131, 1141, 1151 and 1161 may be provided as one or more modules, for example, such as the one or more modules and/or instructions 2402 of the system 2400 of FIG. 24.

As an example, a system can include one or more processors; a network interface operatively coupled to the one or more processors; memory operatively coupled to the one or more processors; and processor-executable instructions stored in the memory and executable by at least one of the processors to instruct the system to: receive data associated with a drilling operation in a geologic environment; determine a state based at least in part on the data; represent the state using a symbolic representation scheme that comprises letters; store the represented state to a database; and, for a combination of letters that represents a combination of states, perform a search of the database to generate a search result.

Figure 12:
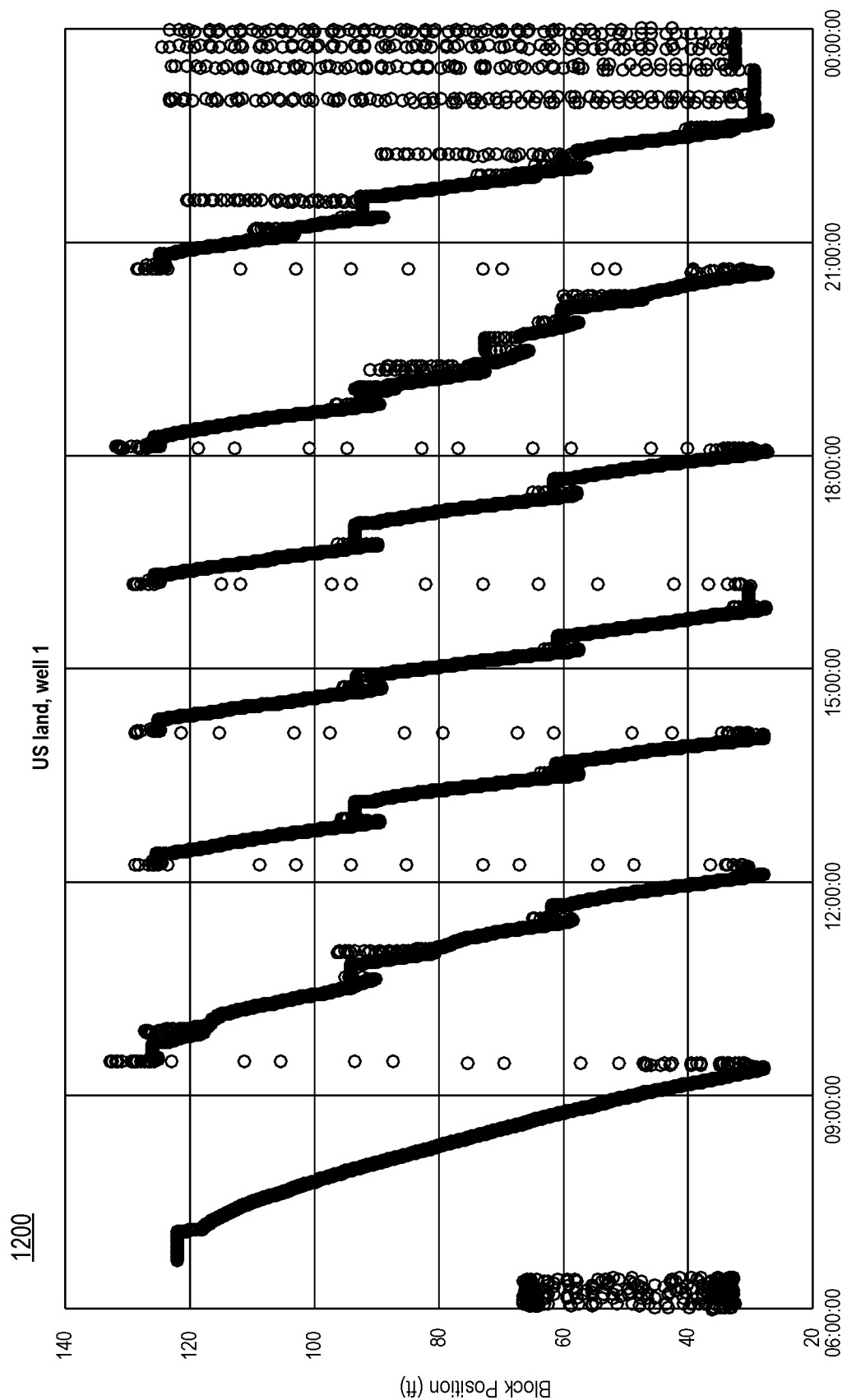
FIG. 12 illustrates an example of a plot.

FIG. 12 shows an example of a rigstates plot 1200 of the rig block position (ordinate) versus time (abscissa) for a rig (land-based). The rig block position points are plotted as dots, which may be color-coded or otherwise coded to represent the rig state at that time. For example, a symbol of a symbolic representation scheme may be "translated" into a graphic such as a marker, which may have a shape, a color, etc. that is associated with an underlying symbol such as, for example, a letter. In such an example, a state can be represented as a letter and a letter can be visually represented as a marker where markers may differ in one or more characteristic to allow for visually distinguishing one state from another state or, for example, generating additional combined types of states that can be represented as a marker, etc. as part of a visualization.

Figure 13:
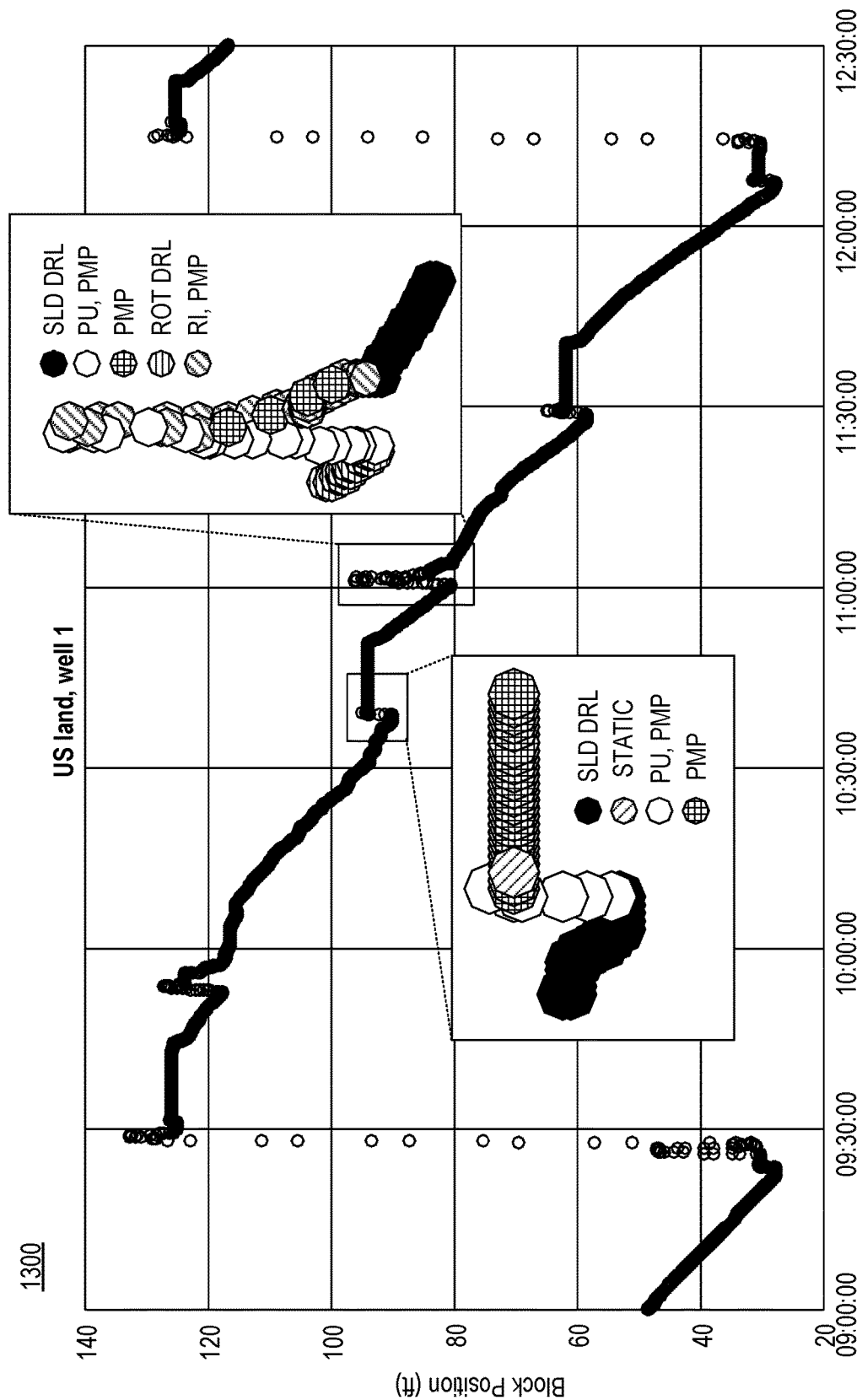
FIG. 13 illustrates an example of a plot.

FIG. 13 shows an example of a rigstates plot 1300, which is a close up of a part of the plot 1200 of FIG. 12. In FIG. 13, two portions are enlarged to illustrate how markers may be coded, for example, to enhance visual inspection. As an example, where markers are color coded, a color scheme may be implemented that allow for filtering using color. For example, consider an RGB scheme with slider controls such that a user may filter out or select markers based at least in part on color. As an example, where markers are color coded, a color coding scheme may be implemented using a color wheel, a color notation, a color space, etc. (e.g., RGB, YUV, etc.).

In the plot 1300, there are 4201 time records for the data section from about 09:00:00 on 23-February-20XX until 12:30:00 on 23-February-20XX (e.g., 3 seconds of a PERFORM™ toolkit data set). As the rigstate does not change at each time record, a method can include forming a lossless compressed version of the rigstates, for example, by finding the start and end time of each contiguous section.

As to compression, consider a method that includes hashing, for example, via a hash as a compressed representation generated via a hash function. As an example, a hash function can be used to map data of an arbitrary size to data of a fixed size. As an example, equal or similar stretches in a large collection of strings (e.g., rigstates, etc.) may be found via use of input strings that can be broken into small pieces where, for example, a hash function may be utilized to detect potentially equal pieces.

As an example, consider a hashing scheme that can provide for mapping character strings between upper and lower case where, for example, a system can use binary encoding of each character (e.g., interpreted as an integer, etc.) to index a table that gives the alternative form of that character ("A" for "a", "8" for "8", etc.). In such an example, each character may be stored in about 8 bits (as in extended ASCII or ISO Latin 1) where a table may include $2^8=256$ entries; in the case of Unicode characters, the table would have $17 \times 2^{16} = 1114112$ entries.

As an example, mapping of two-letter codes (e.g., where a rigstate may be represented via two-letters, etc.) may be akin to mapping of country codes like "us" or "za" to country names ($26^2=676$ table entries), 5-digit zip codes like 13083 to city names (100000 entries), etc. Invalid data values (such as the country code "xx" or the zip code 00000) may be left undefined in the table or mapped to some appropriate "null" value.

As an example, consider the plot 1300 where a first rotary drilling segment extends from 09:45:30 until 09:52:45, which corresponds to 146 samples at a 3 second sampling rate. The segment may be stored using a compressed version of rigstates as follows in Table 1, where, for the plot 1300, there are 126 rows, the first 20 being in Table 1:

TABLE 1

| Start_time | End_time | Rigstate |
| --- | --- | --- |
| 23-Feb-20XX 09:00:00 | 23-Feb-20XX 09:23:30 | 1 (Slide Drill) |
| 23-Feb-20XX 09:23:33 | 23-Feb-20XX 09:23:33 | 12 (Pump) |
| 23-Feb-20XX 09:23:36 | 23-Feb-20XX 09:23:51 | 8 (Pull Up, Pump) |
| 23-Feb-20XX 09:23:54 | 23-Feb-20XX 09:24:12 | 12 (Pump) |
| 23-Feb-20XX 09:24:15 | 23-Feb-20XX 09:24:18 | 4 (Run In, Pump) |
| 23-Feb-20XX 09:24:21 | 23-Feb-20XX 09:25:24 | 12 (Pump) |
| 23-Feb-20XX 09:25:27 | 23-Feb-20XX 09:31:18 | 2 (In Slips) |
| 23-Feb-20XX 09:31:21 | 23-Feb-20XX 09:31:21 | 8 (Pull Up, Pump) |
| 23-Feb-20XX 09:31:24 | 23-Feb-20XX 09:31:24 | 12 (Pump) |
| 23-Feb-20XX 09:31:27 | 23-Feb-20XX 09:31:30 | 4 (Run In, Pump) |
| 23-Feb-20XX 09:31:33 | 23-Feb-20XX 09:43:15 | 12 (Pump) |
| 23-Feb-20XX 09:43:18 | 23-Feb-20XX 09:43:21 | 4 (Run In, Pump) |
| 23-Feb-20XX 09:43:24 | 23-Feb-20XX 09:43:30 | 12 (Pump) |
| 23-Feb-20XX 09:43:33 | 23-Feb-20XX 09:44:03 | 11 (Rotate, Pump) |
| 23-Feb-20XX 09:44:06 | 23-Feb-20XX 09:44:06 | 3 (Ream) |
| 23-Feb-20XX 09:44:09 | 23-Feb-20XX 09:44:09 | 11 (Rotate, Pump) |
| 23-Feb-20XX 09:44:12 | 23-Feb-20XX 09:45:00 | 3 (Ream) |
| 23-Feb-20XX 09:45:03 | 23-Feb-20XX 09:45:03 | 11 (Rotate, Pump) |
| 23-Feb-20XX 09:45:06 | 23-Feb-20XX 09:45:27 | 3 (Ream) |
| 23-Feb-20XX 09:45:30 | 23-Feb-20XX 09:52:45 | 0 (Rotary Drill) |

Such an approach provides a sequence of rigstates, for example, from an initial slide drill, through the connection until rotary drilling the next stand. Representing the data as a sequence of states is useful for various purposes. For example, it can be a process index and can be used to locate particular combinations of states of interest. Since each state has a start and end time (e.g., in a time series approach), it is possible to go back to the original time based data to see how the various channels, such as torque, RPM, standpipe pressure, etc. varied during the combination of interest. In a real-time operation, decisions may be made (e.g., via a computing system) more rapidly. Where one or more control actions are taken based on one or more decisions, a real-time operation may be performed in an expedite manner, either by expediting drilling operation and/or by reducing non-productive time, which can include so-called invisible lost time (ILT).

As an example, searching for combinations of states can be facilitated using a particular approach that is amenable to search engines such as text search engines. For example, such an approach can replace the number used to represent each state (0 for rotary drilling, 1 for slide drilling, 2 for in slips, 3 for . . . ) with a letter (a for rotary drilling, b for slide drilling, c for in slips, d for . . . ). Such an approach can provide, for example, the following information, as in Table 2:

TABLE 2

| 0 | Rotary Drill | a |
| --- | --- | --- |
| 1 | Slide Drill | b |
| 2 | In Slips | c |
| 3 | Ream | d |
| 4 | Run In, Pump | e |
| 5 | Run In, Rotate | f |

TABLE 2-continued

| 6 | Run In | g |
| --- | --- | --- |
| 7 | Back Ream | h |
| 8 | Pull Up, Pump | i |
| 9 | Pull Up, Rotate | j |
| 10 | Pull Up | k |
| 11 | Rotate, Pump | l |
| 12 | Pump | m |
| 13 | Rotate | n |
| 14 | Stationary | o |
| 15 | Unknown | P |
| 16 | Absent | q |

Referring again to the first 20 rigstates in Table 1, above, as a character string, they become: bmimemcimememldld-lda In the plot 1300, a method can include representing the sequence of the 126 states as:

bmimemcimememldldldahimiemememememebimbmbmimebimbihiememo
meimlmldldldahiemiemememememebimimimebihieiememomememebmiemog
ckgomememb As an example, a sequence of 495 states in the plot 1200 can be represented as:

cgcogckgkgcgckgckgkgkgogckgcomomebmimbmimemcimememldldldahim
iememememebimbmbmimebimbihiememomeimlmldldldahiemiememem
emebimimimebihieiememomememebmiemogckgomemembihiemomomeme
bihiemomememebmihiegckogomememebmiemomememebiemomememebm
ihiemomogocgomememembimbiemomememebihiemomemeemeemebimieg
ckgomememebiememomememeebiemldldldldldahlhiemiememebimgomime
memebiemomldldlddahihiemiebiegckgomememebiemldahiegomiememe
bieldhldahiegomiemimememememememeemeememememebimemlmldldldldalh
limememmomlhimelmiedlhie As an example, a method can describe a process sequence in a manner that facilitates searching and/or analysis (e.g., using text searching/query tools). As an example, a text search tool may be used to find exact matches, approximate matches, matches close to other matches, etc. Such tools are available in various computing languages and may be included in a framework such as, for example, the PERFORM™ toolkit (PTK) framework. As an example, application programming interface(s) and/or plug-in, add-ons, etc. may be implemented. As an example, one or more visualization tools may be implemented. As an example, a user interfaces may allow for searching, analysis, etc. As an example, a method can include processing and/or reporting information based on a state-based system.

Figure 14:
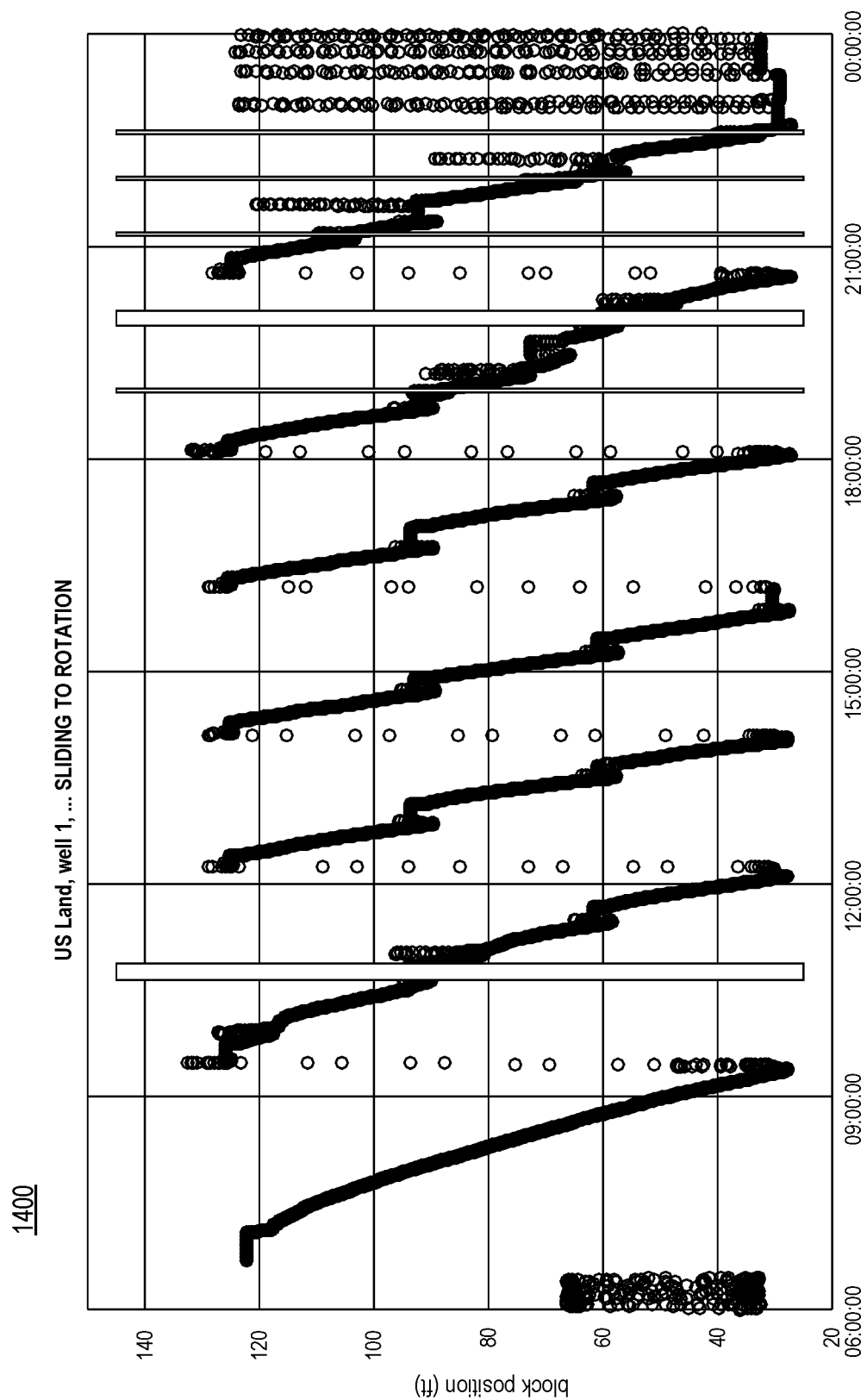
FIG. 14 illustrates an example of a plot.

FIG. 14 shows an example plot 1400. In such an example, a user may want to find sections where a change is from slide drilling to rotary drilling (e.g., from a slide drilling state transitioning to a rotary drilling state0. In such an example, a search engine may be implemented to find sequences that begin immediately after slide drilling, and end just before rotary drilling, but do not include going in slips. With the text conversion described above, consider searching the text string for occurrences of letters that are bounded at the start by b (slide drilling) and at the end by a (rotary drilling) but do not include c (in slips).

As an example, a domain specific language or other type of language may be utilized to perform searches and/or analyses. As an example, consider the following expression: regexp (rigstate_string, '(?<=b)[d-q]*(?=a)')

In FIG. 14, the plot 1400 includes vertical rectangles that show where the sequences match the desired conditions (e.g., query). Such rectangles, or other appropriate markers, can be search results. As an example, a computing system can provide for rendering of search results to a display (e.g., a GUI) where the search results identify a state, states or state transitions versus time. In such an example, search results may optionally be rendered in combination with data such as block position and/or other data associated with a drilling operation(s).

Figure 15:
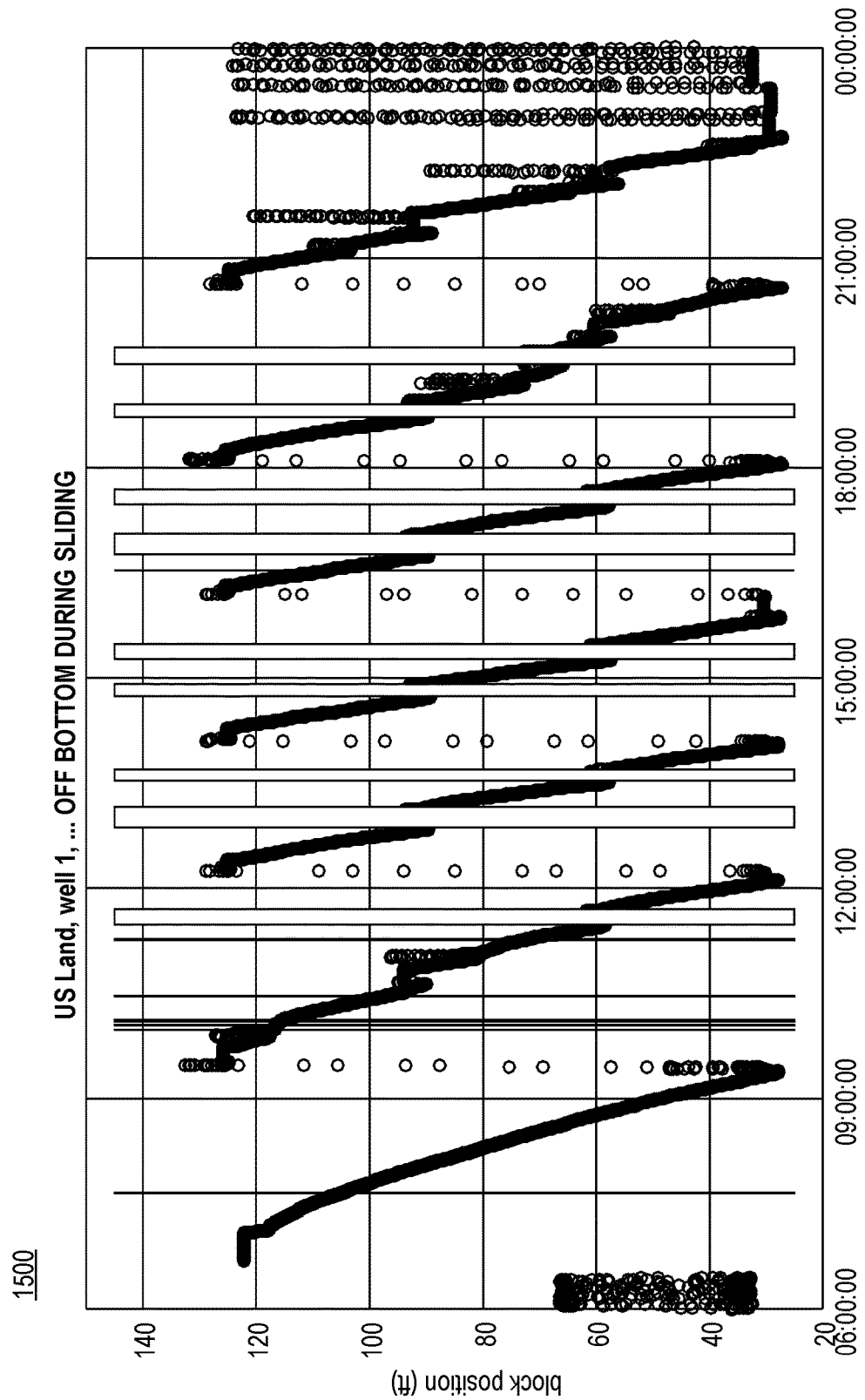
FIG. 15 illustrates an example of a plot.

FIG. 15 shows an example plot 1500, in this case looking for occurrences of the driller coming off bottom during slide drilling. In this example, a search is performed for sequences that begin immediately after sliding, and end with a return to sliding, without including in slips or rotary drilling. Such a search query may be expressed as a string of letters where a search engine receives the search query and searches a database of letters that represent states of a state machine (e.g., a rig system or rig systems).

As an example, where start and end times of individual sequences may be known, a method can include calculating various statistics and, for example, monitoring compliance (e.g., as to best practices or standard operating procedures, etc.).

As an example, consider one or more of the following analyses: How much time was spent in each stand, or each hole section, coming off bottom during sliding? Consider a driller coming off bottom to take a survey—does the driller follow the set procedure in terms of sequence, duration, and drilling parameters? Such types of analyses may be performed using a state-based system.

As an example, a method can include processing rigstates to produce "drillstates" (e.g., as in the PTK, etc.). An approach as in the method 1100 of FIG. 11 may optionally provide additional control. For example, consider a workflow that includes finding patterns (e.g., state transitions) that start with in slips, and end within slips, which may identify likely candidates for stands (e.g., either drilling or tripping). Checking the rig block position between going in slips and coming out of slips can provide an indication if pipe has been added or removed, and gives the length of the pipe. Calculating the time breakdown, and sequence of states, between coming out of slips and going on bottom, or coming off bottom and going in slips can allow for monitoring (e.g., efficiency and adherence to SOPs, etc.). As an example, one or more types of behaviors may be categorized, for example, consider taking surveys, orienting toolface, working the pipe, etc.

Figure 16:
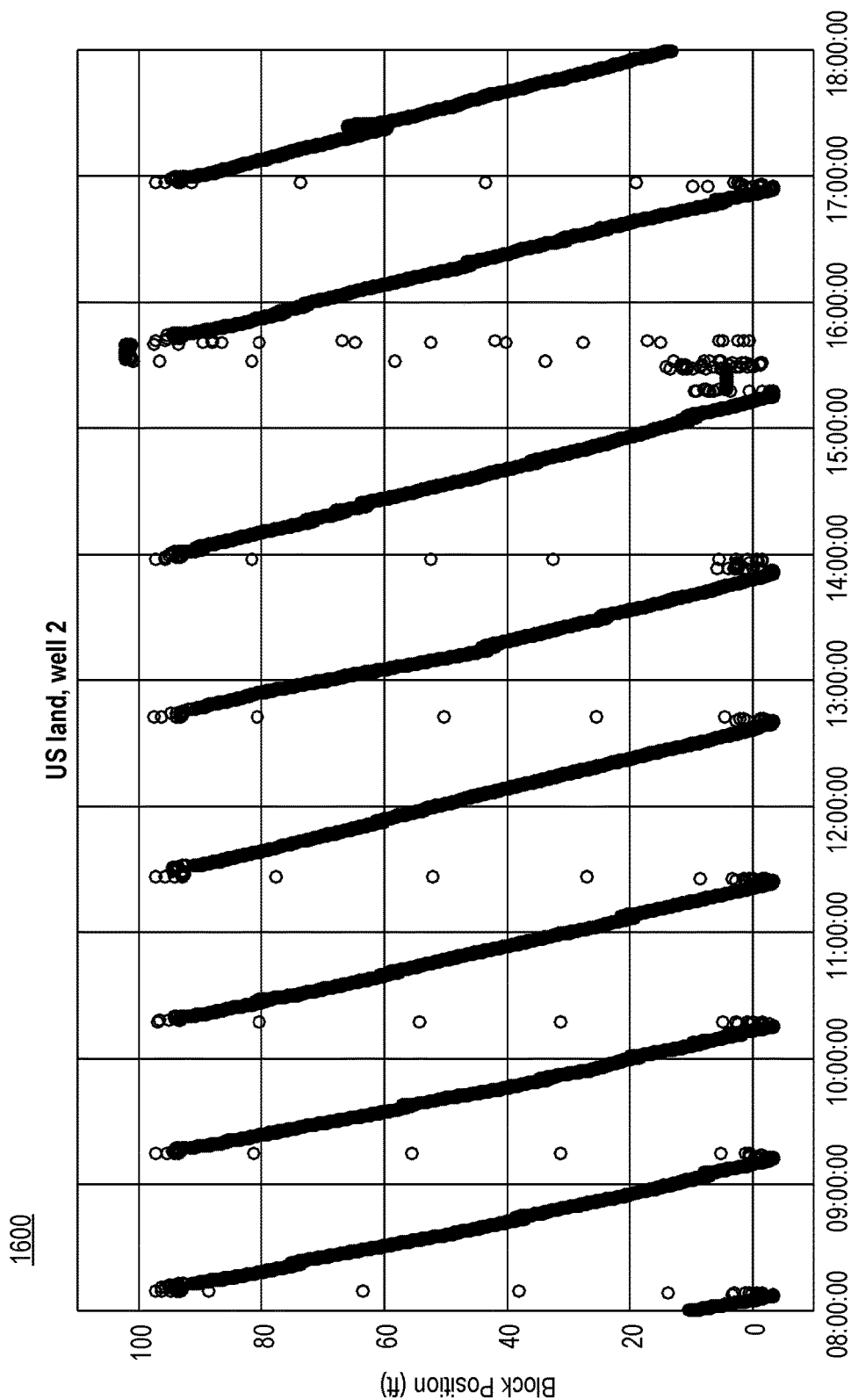
FIG. 16 illustrates an example of a plot.

FIG. 16 shows an example plot 1600 of a motor stall example. Specifically, the states in the plot 1600 are based on data associated with rotary drilling, with a motor in a string (land-based). From the plot 1600, one may notice that the driller comes off bottom several times each stand. Such data may be associated with the driller and, for example, used as feedback to the driller.

As an example, a framework can include associating states and state transitions with one or more operators. As an example, such a framework may be utilized for training, warnings, etc., on-line and/or off-line. For example, a framework may aim to optimize drilling operations where feedback can be directed to a driller (e.g., dog house) when particular beneficial state sequences occur and/or when particular non-beneficial state sequences occur. As an example, a framework may identify a sequence of states that precedes a noted behavior of a driller and notify the driller (e.g., via text message, via rendering to a display, via audio, etc.) that the noted behavior is likely and that if the driller wishes to modify that behavior, to consider acting now or within a noted timeframe.

Figure 17:
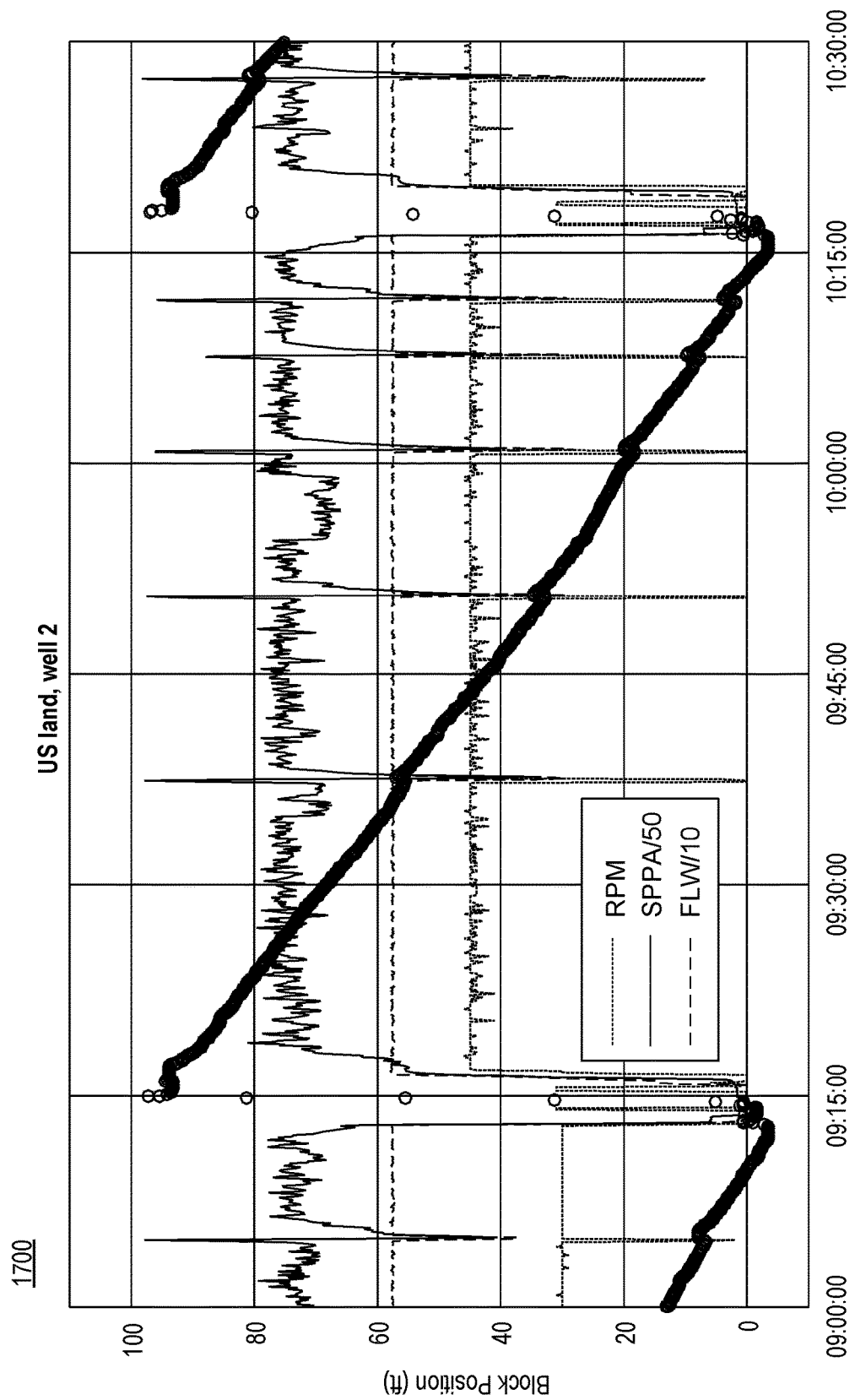
FIG. 17 illustrates an example of a plot.

FIG. 17 shows an example plot 1700 where, along with the RPM represented by a dotted line, the standpipe pressure (divided by 50) is represented by a solid line, and the flow in (divided by 10) is represented by a dashed line. These off bottom sections illustrate examples of motor stall. As the motor stalls, the torque in the string builds up and the top drive torque limit is reached, causing the top drive to stall, hence causing the RPM to fall to zero. At approximately the same time, the standpipe pressure increases sharply due to the motor stall, and the flow is reduced (e.g., one of the pumps shuts down). Under such circumstances, the driller can pick up off bottom and wait for the pressure, flow and RPM to return to normal (e.g., within defined limits, trends, etc.), and then the driller may tag bottom and continues to drill.

As an example, a method can include a search for a combination of events. For example, consider a query statement as follows:

regexp (rigstate_string, '(?<=a)[b,d-q]*(?=a)')

Figure 18:
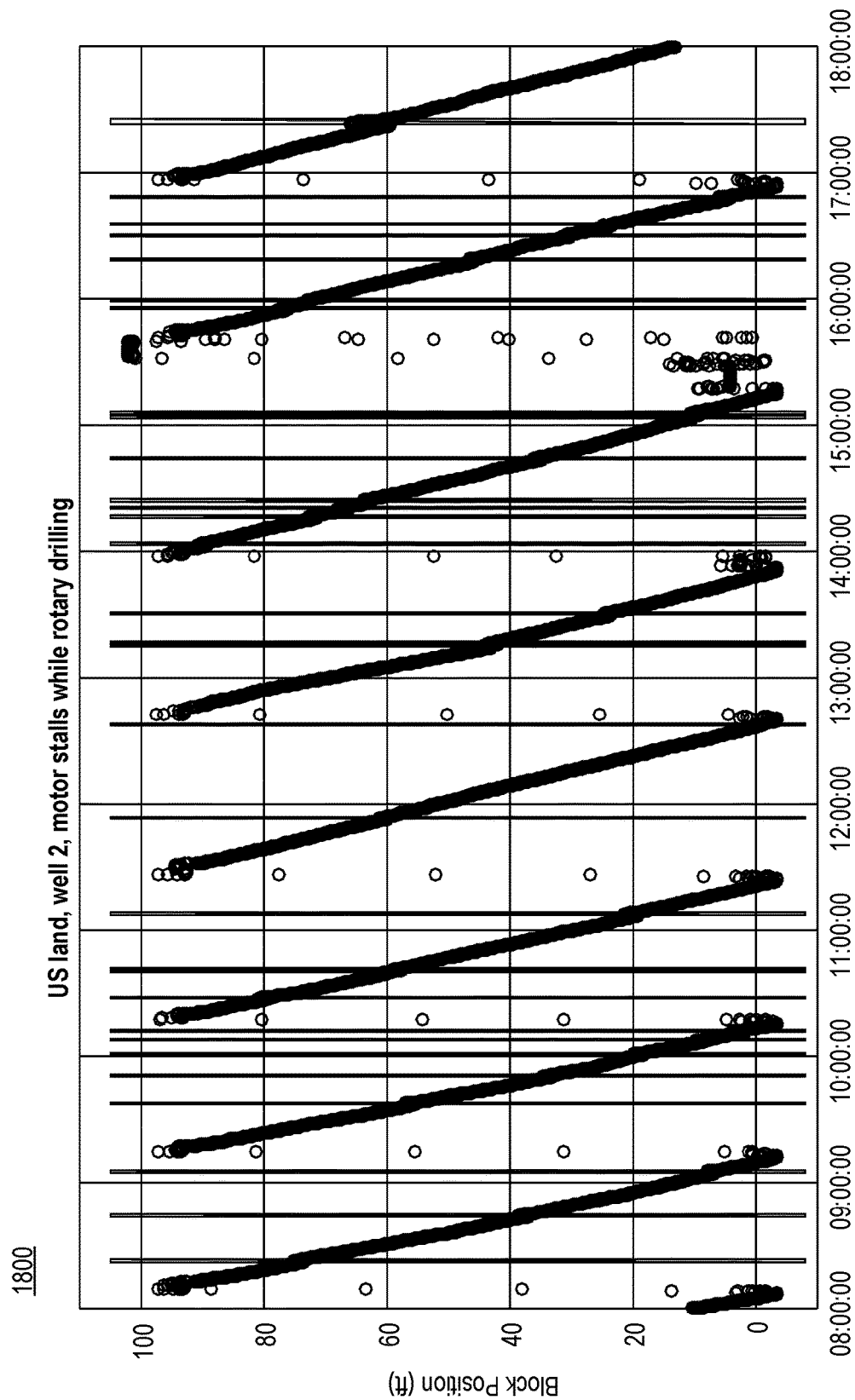
FIG. 18 illustrates an example of a plot.

FIG. 18 shows an example plot 1800 where vertical bars indicate when the queried sequence occurs in time. In the example of FIG. 18, the states are associated with scenarios where a motor stalls while rotary drilling. Such a sequence of states may be stored to a database, optionally in association with a driller. In such an example, a driller may be instructed to review such states and to comment on the states (e.g., and state transitions) for purposes of continuing to drill at the site and/or to drill at another site. A framework may optionally highlight automatically beneficial and/or non-beneficial states, which may facilitate review by a driller, a drill team, a manager, etc. As an example, such automatic highlighting may occur via automatic searching where particular states (e.g., state transitions, etc.) are continually searched, optionally in real-time.

Figure 19:
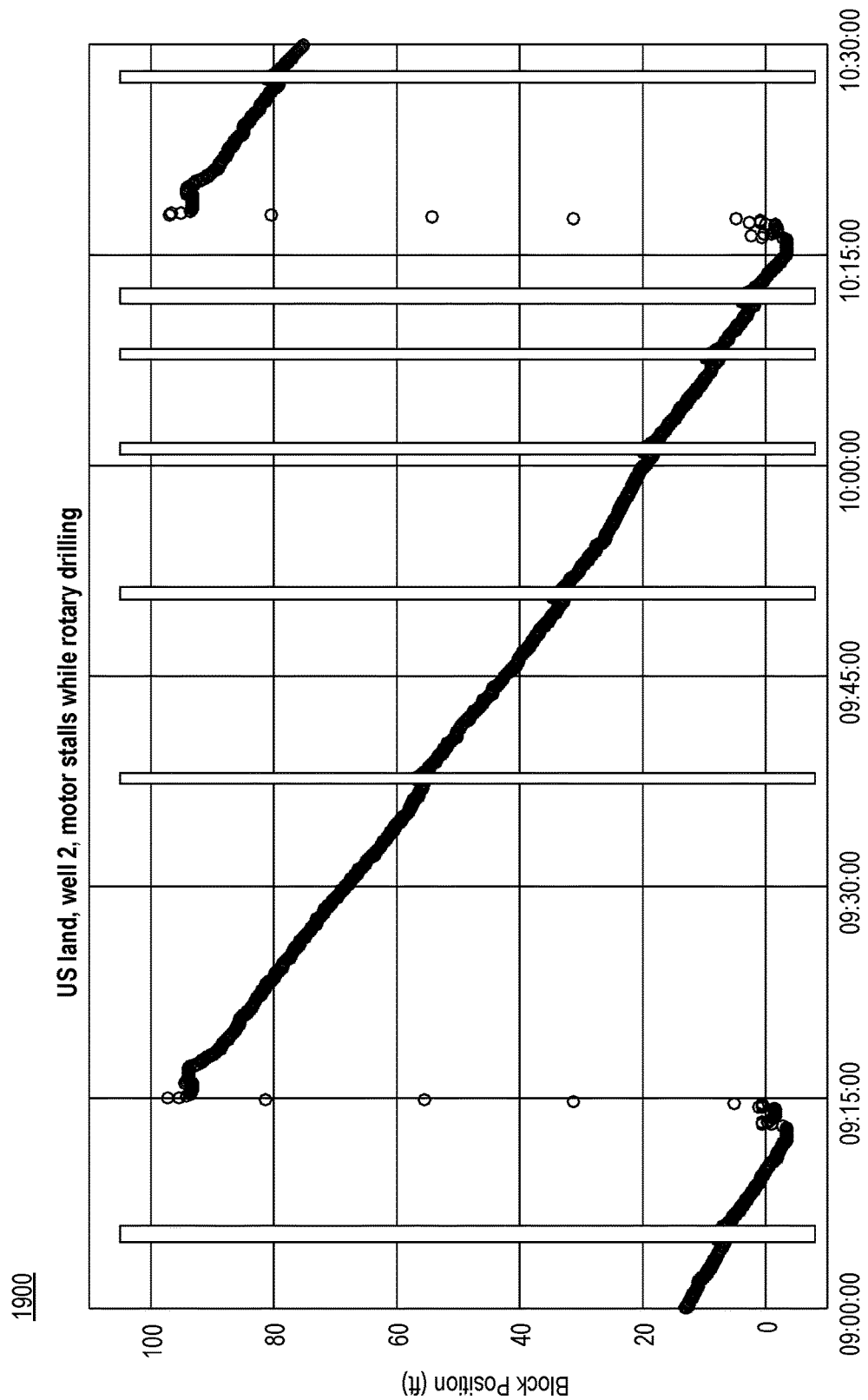
FIG. 19 illustrates an example of a plot.

FIG. 19 shows an example plot 1900, which is an enlarged view of a portion of the plot 1800 of FIG. 18. As seen in the plot 1900, the block position falls with respect to time where during the fall of the block position, the motor stalls at various times during rotary drilling. A stall of a motor can be a non-beneficial state as depth or length of a trajectory of a borehole is not increased in a motor stall state.

As an example, where start and end time of individual occurrences are known, a method can include calculating time lost, which may be "invisible lost time" (ILT) (e.g., with respect to various operations).

ILT related to rig drilling operations may be defined as the difference between actual operational duration and a best practice target. Such time is considered to be "invisible" as it does not tend to appear on a report. In various examples, a framework may identify ILT based on a sequence of states (e.g., transition from one state to another state). For example, a framework can include an ILT search and reporting algorithm that utilized ILT queries that a search engine can execute to identify ILT and to aggregate and report ILT, for example, in real-time, hourly, daily, on a job-basis, etc. Such reporting may provide for adjusting of behavior, operation of equipment, etc. in a manner that can reduce ILT and, hence, NPT.

As to ILT, some terms include BOBT as the time for drilling and producing the hole; FLAT time as the time for constructing a well besides the BOBT (e.g., BHA handling, tripping, running casing, BOP work, drilling connections, etc.); and LT as time that represents deviation from a plan (e.g., problem time) due to, for example, one or more unexpected/unplanned events like hole problems, tool failures, rig repair etc.

As an example, a method may include examining a sequence of events during one or more occurrences and, for example, checking if a driller is following a recommended procedure for dealing with motor stalls. As an example, a method can include identifying one or more time periods immediately prior to one or more stalls and/or examining one or more drilling parameters, for example, to look for a root cause.

As mentioned, a method can include generating one or more visualizations of state-based information. For example, consider the 495 states represented as letters. In terms of frequency, they are as follows in Table 3:

TABLE 3

| | |
|---|---|
| A | 7 |
| B | 28 |
| C | 14 |
| D | 24 |
| E | 117 |
| F | 0 |
| G | 24 |
| H | 19 |
| I | 59 |
| J | 0 |
| K | 11 |
| L | 30 |
| M | 133 |
| N | 0 |
| O | 29 |

Figure 20:
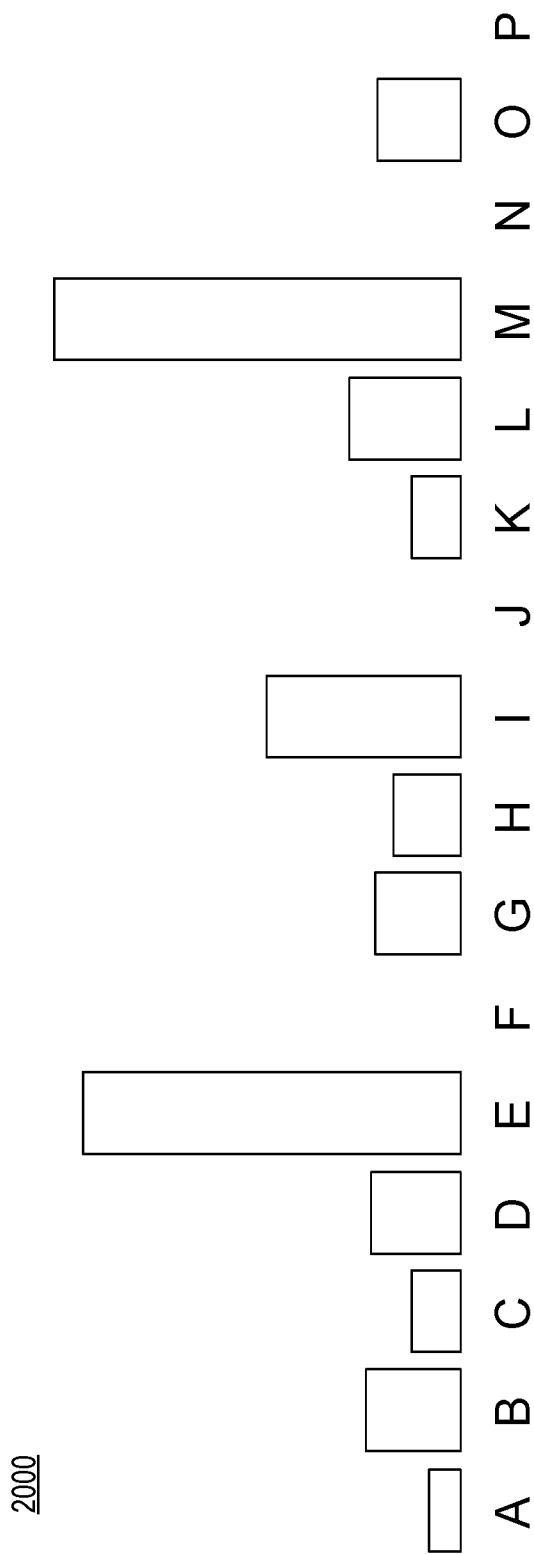
FIG. 20 illustrates an example of a plot.

FIG. 20 shows an example of a histogram plot 2000 (e.g., bar chart) where the bars may be graphical controls. For example, consider clicking on a bar and highlighting the portions of a plot such as the example plot 1200 of FIG. 12 as to the corresponding states.

As an example, a graphical user interface (GUI) may allow a user to rearrange bars on a bar chart to generate sequences that can be utilized by a search engine to perform searches. For example, consider dragging and dropping the "I" bar next to the "D" bar where a plot may then be re-rendered to highlight occurrences of "ID" states. In such an example, a user may readily see the "overlap" between occurrences of the "I" bar and the "D" bar in terms of the counts for each of these two bars, as well as in relationship to other bars in a histogram plot.

Figure 21:
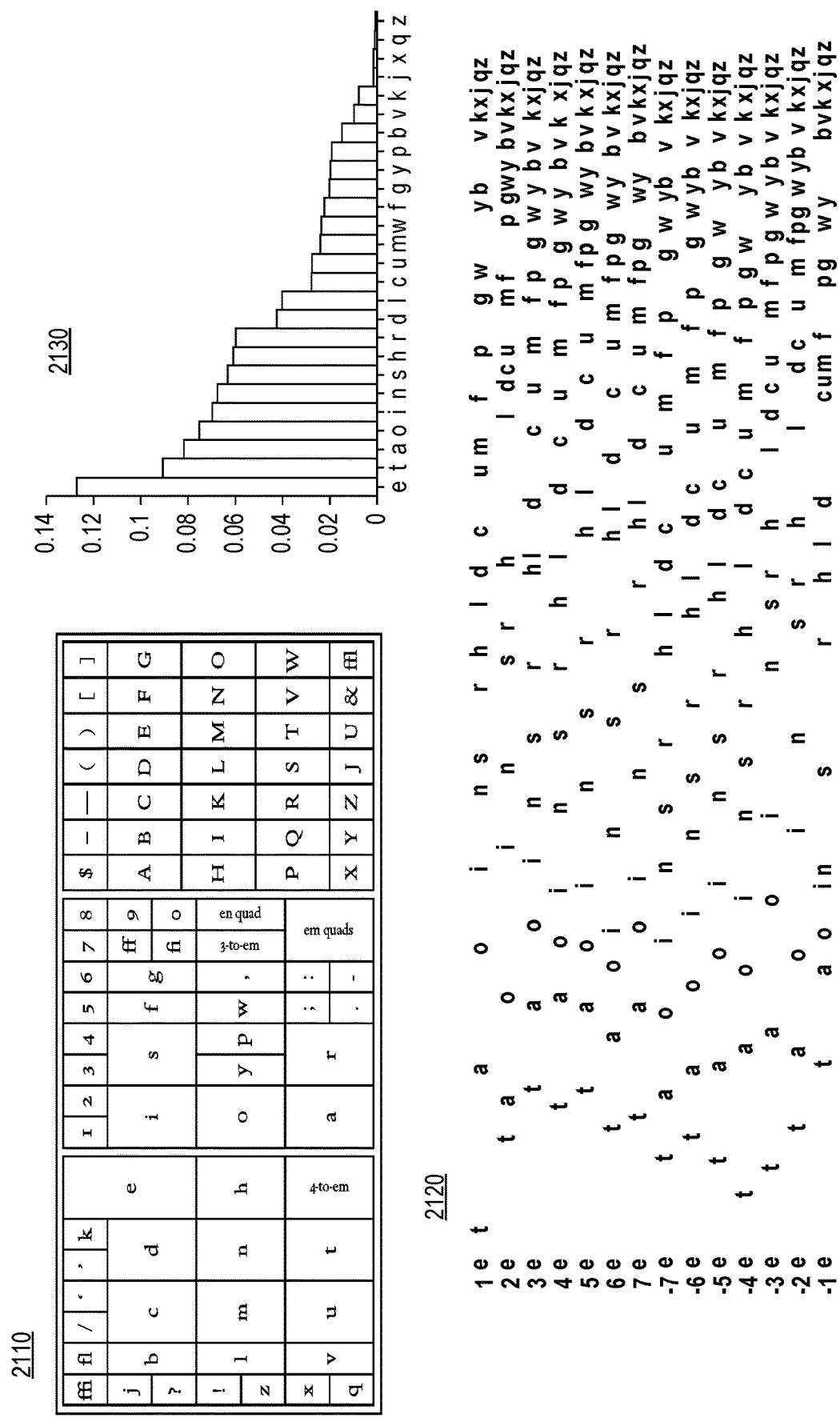
FIG. 21 illustrates examples of plots.

FIG. 21 shows an example plot 2110, an example plot 2120, and an example plot 2130. The plot 2110 corresponds to an example of a California Job Case as used by typesetters where the most frequently used letter has the largest area. As an example, a treemap may be generated and/or utilized where areas correspond to a state, a sequence of states, etc. (e.g., depending on one or more criteria). As an example, a wordle approach may be utilized on a single state or a multi-state basis where, for example, the most common state or state sequence appears larger than others (e.g., akin to area of a treemap).

As to the plot 2120, it shows letter counts by position within a word (e.g., a sequence of states). The plot 2120 also shows frequencies for positions relative to the end of the word: "−1" means the last letter, "−2" means the second to last, and so on. As shown in the plot 2120, frequencies may vary; for example, "e" is uncommon as the first letter (4 times less frequent than elsewhere); similarly "n" is 3 times less common as the first letter than it is overall. The letter "e" makes a comeback as the most common last letter (and also very common at 3rd and 5th letter places). The most common first letter is "t" and the most common second letter is "o". In such an approach, each of the letters may represent a different state such that sequences of states can form words and words may be analyzed as to letter frequency and/or occurrence in a string (e.g., transitions of a state machine).

As an example, a plot may be akin to frequencies of letters used in different languages. As an example, such a plot may be utilized to show frequencies of states for one or more sites, wells, rigs, etc. For example, where a field includes 10 wells, state information may be represented using a plot to readily see how state information varies from one well to another well. Such an approach may be utilized to readily identify one or more wells that differ, whether in a positive sense, a negative sense, a neutral sense, etc.

In FIG. 21, the plot 2130 shows frequency of occurrence for different letters with respect to a corpus. As an example, a drilling operation may generate a corpus or corpuses (e.g., one or more collections of texts). As an example, a driller, as an individual, may have an associated corpus based on jobs performed. As an example, a framework may analyze corpuses associated with different sites, different equipment, different people, etc., and generate one or more plots such as the plot 2130. In such an example, the framework may utilize such information to harmonize, train, plan, etc. one or more operations associated with drilling (e.g., in real-time, future, etc.).

As an example, the plots 2110, 2120 and 2130 may be utilized as graphical controls. For example, consider linking a plot such as the plot 2110 to a plot such as the plot 1200. As another example, consider linking a plot such as the plot 2120 to a plurality of plots such as a plurality of the plot 1200 where each corresponds to a different well.

As an example, a method can include processing rig states to turn them into a richer version of drillstates with the accompanying statistical breakdown which can be incorporated into reports, KPIs, etc. As an example, such a method may be semi-automated or automated.

As an example, a method can include parsing sequences of events and accompanying drilling parameters to check for compliance with SOPs. Such information may be incorporated into one or more reports. As an example, non-compliance can be flagged in near real-time.

As an example, a method can include providing interpretation engineers with a query tool for examining the drilling data. Such an approach may allow for constructing a query in drilling language (e.g., a DSL) where the query is appropriately converted into a search command.

As an example, a method can include building a set of automated searches to go through the data sets (e.g., hundreds, thousands, etc.) where determined rigstates exist. Such an example may be implemented in a workflow, for example, as to offset analysis.

As an example, a method can include identifying and categorizing ILTs, for example, in near real-time or in post mortem mode. As an example, a non-productive time event or events may be defined with respect to a contiguous period of time such as, for example, 30 minutes or more. Given such a definition, individual motor stalls that may be of the order of minutes (e.g., 1 minute to 6 minutes) may be identified in a different manner, for example, via a framework that can detect such short occurrence events. A framework may be utilized as an ILT framework that can identify short occurrence events, which may be defined by a time metric (e.g., less than approximately 10 minutes, less than approximately 20 minutes, less than approximately 30 minutes, etc.). Such a framework may generate one or more reports and/or issue one or more instructions in real-time upon occurrence of such an event. As applied in site-based operations, the framework may help to reduce time to complete one or more operations and may help to identify beneficial and/or non-beneficial states (e.g., and/or sequences of states).

Figure 22:
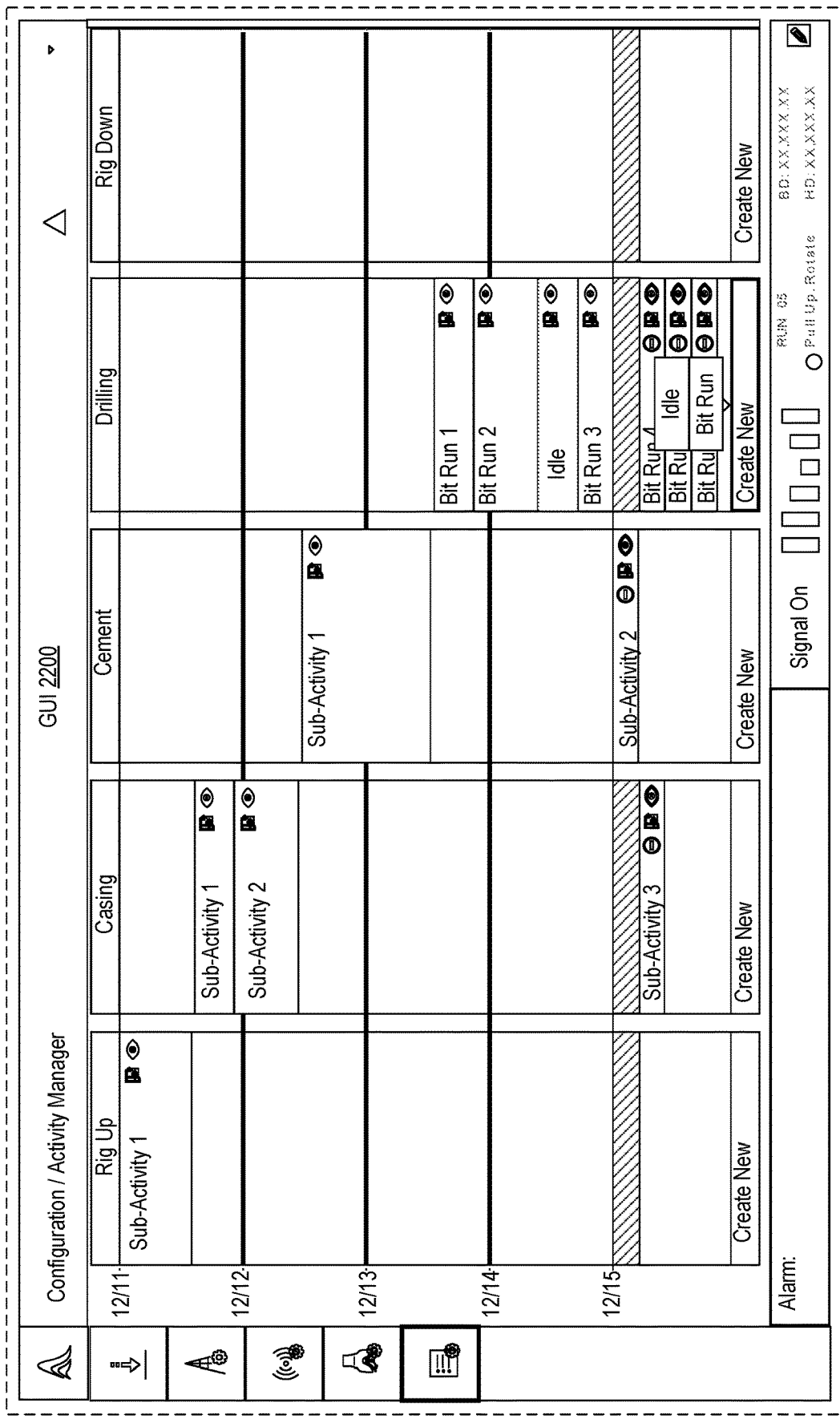
FIG. 22 illustrates an example of a graphical user interface.

FIG. 22 shows an example of a graphical user interface (GUI) 2200 that includes various subsystem tasks as may be part of a well plan. For example, a rig up subsystem, a casing subsystem, a cement subsystem, a drilling subsystem and a rig down subsystem are illustrated as some possible examples of subsystems that can include associated tasks. As shown in the example of FIG. 22, the GUI 2200 includes a timeline, which can be incremented by minute, hour, day, etc. In the example of FIG. 22, the GUI 2200 can be render information as to scheduled tasks that are organized by subsystem type where a scheduled task may aim to achieve a desired state of wellsite equipment.

In the example of FIG. 22, the various tasks are shown as Sub-Activities and as other types of tasks (e.g., Idle, Bit Run, etc.), which may be considered to be Sub-Activities. As an example, graphical controls can allow for addition of one or more new activities (e.g., scheduling of new tasks). As an example, graphical controls can allow for rescheduling one or more tasks.

As an example, the GUI 2200 can include control graphics for options analyses as to implementation options as to one or more tasks. For example, a user may touch a touchscreen display as to the Sub-Activity 2 graphic under the Casing subsystem heading and call for selection of an implementation option.

In the example of FIG. 22, a dashed box represents a display device onto which the GUI 2200 can be rendered. For example, consider a flat panel display, which may be, for example, a touchscreen display.

Figure 23:
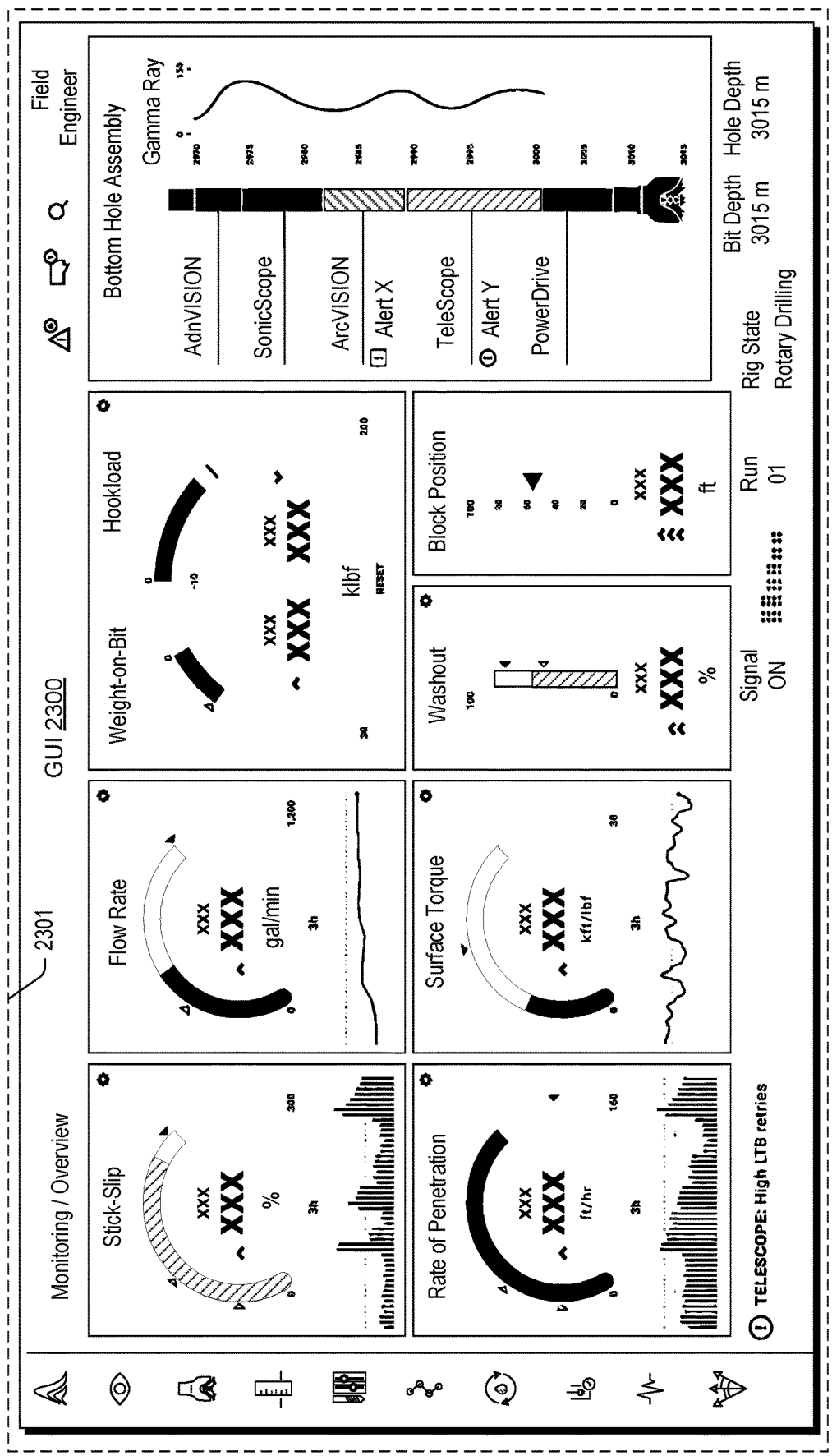
FIG. 23 illustrates an example of a graphical user interface.

FIG. 23 shows an example of a GUI 2300 that is rendered to a display device 2301, represented by a dashed box. For example, consider a flat panel display, which may be, for example, a touchscreen display.

In the example of FIG. 23, the GUI 2300 may be an operational dashboard where the state of one or more pieces of equipment, operations, etc. may be rendered visually, for example, via graphics and/or numbers. As an example, various colors may be utilized to convey state information. As an example, audio may be associated with the GUI 2300 and changes thereto, etc. For example, where a parameter reaches a limit, a color change may occur to a graphic of the display device 2301 and an audio alarm may be rendered via one or more speakers.

As an example, a state-based system may be operatively coupled to a graphical user interface (GUI) such as, for example, the GUI 2200 of FIG. 22 and/or the GUI 2300 of FIG. 23. As an example, a state-based system may be a state-based framework. As an example, such a framework may be part of and/or operatively coupled to one or more other frameworks.

As an example, a method can include receiving data associated with a drilling operation in a geologic environment; determining a state based at least in part on the data; representing the state using a symbolic representation scheme that includes letters; and storing the represented state in a database. In such an example, the method can include, for a combination of letters that represents a combination of states, performing a search engine based search of the database to generate a search result.

As an example, received data can include time series data, depth series data and/or length along a well trajectory series data. As an example, the received data can be or can include symbols.

As an example, a state can be a time series state, a depth series state and/or a length along a well trajectory series state.

As an example, a symbolic representation scheme can be or can include one or more features of a symbolic aggregation approximation scheme.

As an example, a state can be represented as a letter.

As an example, a method can include searching a database of stored represented states based at least in part on a query. For example, such searching may optionally include searching for combinations of states based at least in part on a query. As an example, a query can include information as to a state and/or combinations of states.

As an example, a state can be a rigstate.

As an example, a method can include storing to store one or more represented states to one or more databases. In such an example, a represented state can be a letter that is stored to the database using a coding scheme. For example, consider an ASCII coding scheme.

As an example, a method can include rendering one or more represented states to a display as part of a series plot of a series of states.

As an example, a system can include one or more processors; a network interface operatively coupled to the one or more processors; memory operatively coupled to the one or more processors; and processor-executable instructions stored in the memory and executable by at least one of the processors to instruct the system to: receive data associated with a drilling operation in a geologic environment; determine a state based at least in part on the data; represent the state using a symbolic representation scheme that includes letters; and store the represented state to a database. In such an example, the system can include instructions that, for a combination of letters that represents a combination of states, instruct the system to perform a search of the database to generate a search result.

As an example, processor-executable instructions stored in memory and executable by at least one processor to instruct a system can include instructions to perform a query-based search of a database.

As an example, one or more computer-readable storage media that include computer-executable instructions executable to instruct a computing system to: receive data associated with a drilling operation in a geologic environment; determine a state based at least in part on the data; represent the state using a symbolic representation scheme that includes letters; and store the represented state to a database. In such an example, instructions can be included that, for a combination of letters that represents a combination of states, instruct the computing system to perform a search of the database to generate a search result. As an example, instructions can include instructions executable to instruct a computing system to formulate queries via a domain specific language (DSL). For example, a DSL may be a rig operation DSL, an equipment DSL (e.g., as to equipment performance, health, etc.), a well planning DSL, a reporting DSL, a compliance DSL, a behavior DSL, etc.

Figure 24:
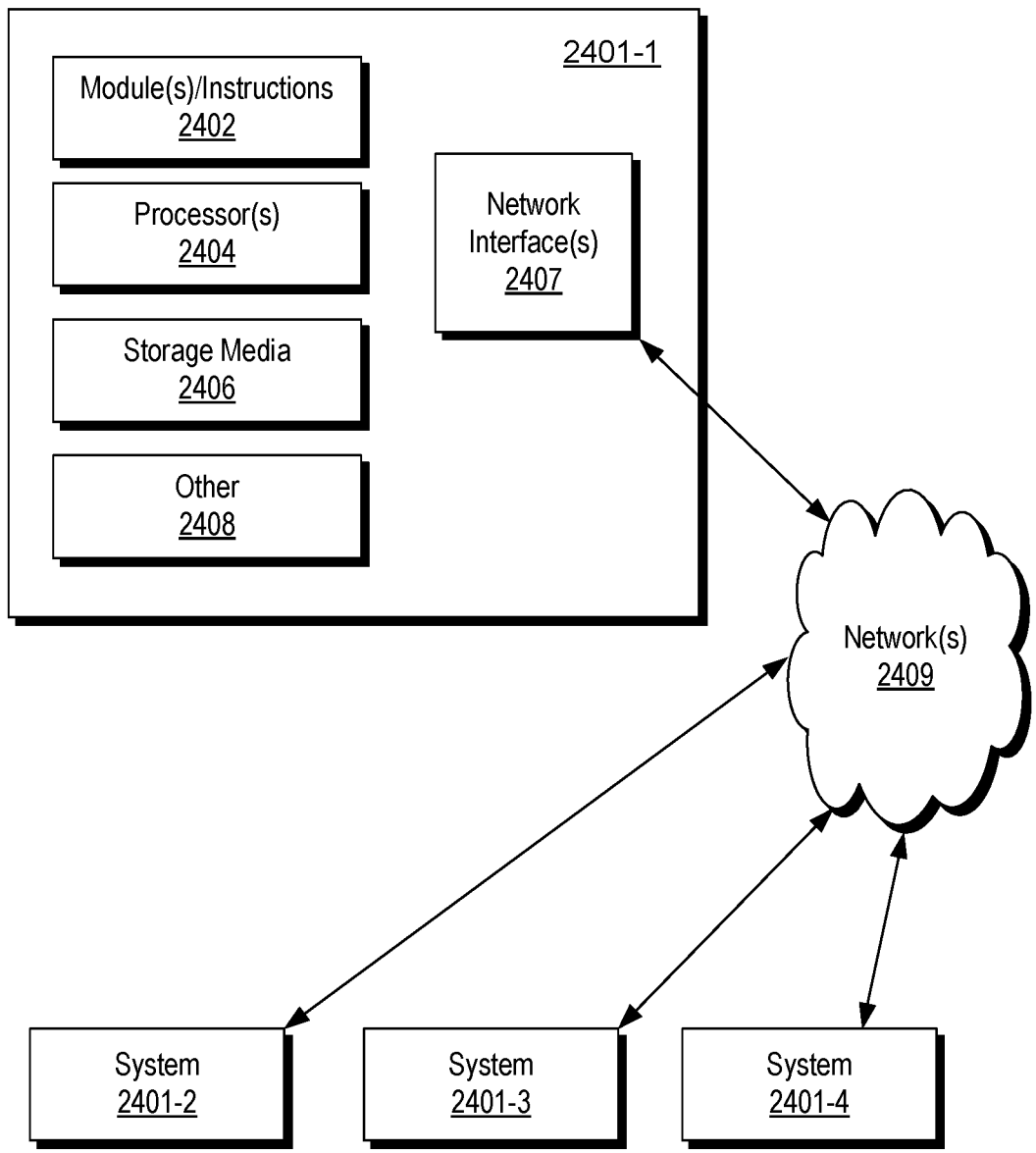
FIG. 24 illustrates examples of computing and networking equipment.

In some embodiments, a method or methods may be executed by a computing system. FIG. 24 shows an example of a system 2400 that can include one or more computing systems 2401-1, 2401-2, 2401-3 and 2401-4, which may be operatively coupled via one or more networks 2409, which may include wired and/or wireless networks.

As an example, a system can include an individual computer system or an arrangement of distributed computer systems. In the example of FIG. 24, the computer system 2401-1 can include one or more modules 2402, which may be or include processor-executable instructions, for example, executable to perform various tasks (e.g., receiving information, requesting information, processing information, simulation, outputting information, etc.).

As an example, a module may be executed independently, or in coordination with, one or more processors 2404, which is (or are) operatively coupled to one or more storage media 2406 (e.g., via wire, wirelessly, etc.). As an example, one or more of the one or more processors 2404 can be operatively coupled to at least one of one or more network interface 2407. In such an example, the computer system 2401-1 can transmit and/or receive information, for example, via the one or more networks 2409 (e.g., consider one or more of the Internet, a private network, a cellular network, a satellite network, etc.).

As an example, the computer system 2401-1 may receive from and/or transmit information to one or more other devices, which may be or include, for example, one or more of the computer systems 2401-2, etc. A device may be located in a physical location that differs from that of the computer system 2401-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2406 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 25:
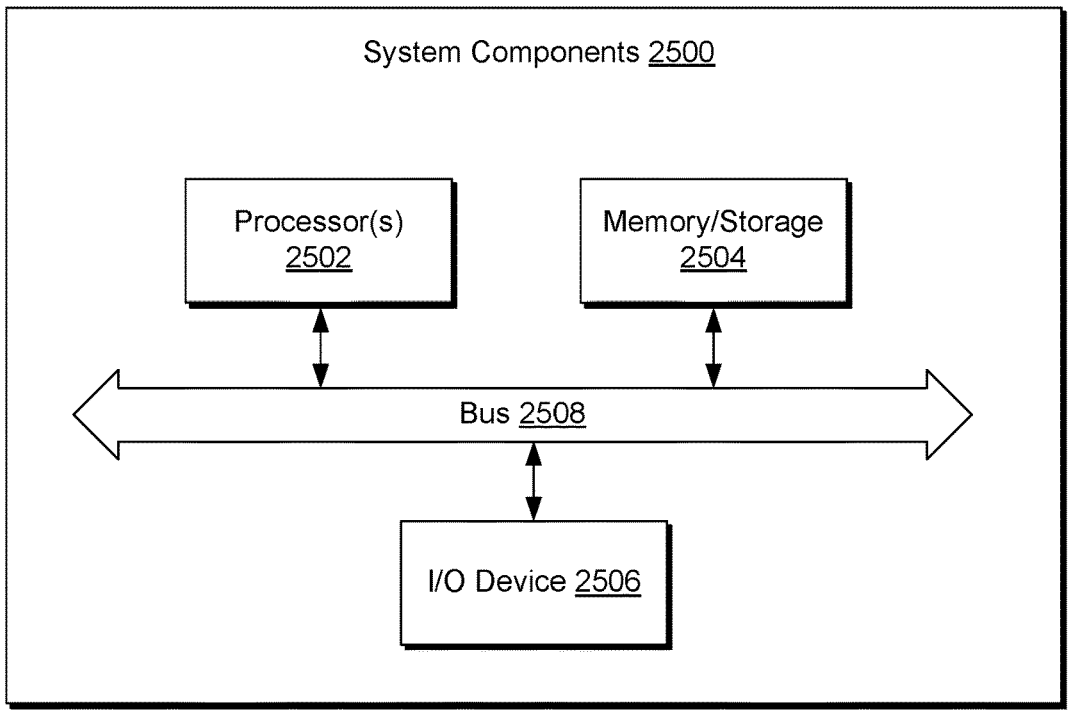
FIG. 25 illustrates example components of a system and a networked system.
Figure 25:
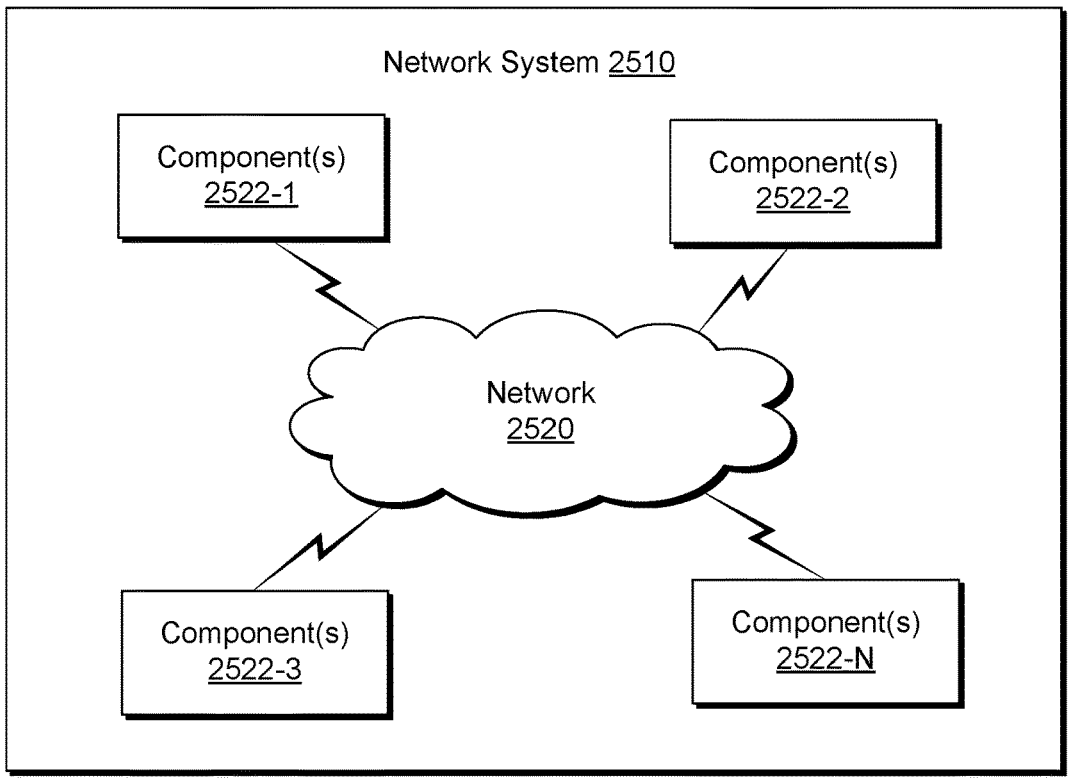

FIG. 25 shows components of a computing system 2500 and a networked system 2510. The system 2500 includes one or more processors 2502, memory and/or storage components 2504, one or more input and/or output devices 2506 and a bus 2508. According to an embodiment, instructions may be stored in one or more computer-readable media (e.g., memory/storage components 2504). Such instructions may be read by one or more processors (e.g., the processor(s) 2502) via a communication bus (e.g., the bus 2508), which may be wired or wireless. The one or more processors may execute such instructions to implement (wholly or in part) one or more attributes (e.g., as part of a method). A user may view output from and interact with a process via an I/O device (e.g., the device 2506). According to an embodiment, a computer-readable medium may be a storage component such as a physical memory storage device, for example, a chip, a chip on a package, a memory card, etc.

According to an embodiment, components may be distributed, such as in the network system 2510. The network system 2510 includes components 2522-1, 2522-2, 2522-3, . . . 2522-N. For example, the components 2522-1 may include the processor(s) 2502 while the component(s) 2522-3 may include memory accessible by the processor(s) 2502. Further, the component(s) 2522-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   receiving data associated with a drilling operation in a geologic environment that utilizes a rig that comprises a traveling block and a block position sensor that acquires a channel of block position data;
   determining a state as one of a plurality of states based at least in part on a portion of the data, wherein the portion of the data comprises multi-channel data acquired during the drilling operation by a plurality of different types of sensors, wherein the plurality of states comprises drilling states;
   representing the state using a symbolic representation scheme that comprises assigned letters;
   storing the represented state in a database;
   for a string that comprises one or more of the assigned letters that represents a process as a sequence of one or more of the plurality of states that comprise at least one of the plurality of states temporally between instances of two of the drilling states for a corresponding length of drill pipe operatively coupled to the traveling block, performing a search engine based search of the database to generate a search result of one or more occurrences of the process; and
   rendering at least a portion of at least one of the one or more occurrences of the process to a display overlaid on at least a corresponding portion of the block position data with respect to time for the corresponding length of drill pipe.

2. The method of claim 1 wherein the data comprise time series data, wherein at least a portion of the data comprises values and corresponding times.

3. The method of claim 1 wherein the data comprise depth series data, wherein at least a portion of data comprises values and corresponding depths that correspond to depths of a borehole.

4. The method of claim 1 wherein the data comprise length along a borehole trajectory series data, wherein at least a portion of data comprises values and corresponding lengths that correspond to lengths along a borehole trajectory.

5. The method of claim 1 wherein the state comprises a time series state.

6. The method of claim 1 wherein the state comprises a depth series state.

7. The method of claim 1 wherein the state comprises a length along a borehole trajectory series state.

8. The method of claim 1 wherein the symbolic representation scheme comprises a symbolic aggregation approximation scheme.

9. The method of claim 1 wherein the state is represented as a letter.

10. The method of claim 1 wherein the string represents a sequence of state transitions.

11. The method of claim 1 wherein the state comprises a rigstate.

12. The method of claim 1 wherein the string represents an invisible lost time event.

13. The method of claim 1 wherein the represented state comprises a letter that is stored to the database using a coding scheme.

14. The method of claim 13 wherein the coding scheme comprises an ASCII coding scheme.

15. The method of claim 1 comprising rendering the represented state to a display as part of a series plot of a series of states.

16. The method of claim 1, wherein the instances of two of the drilling states for the corresponding length of drill pipe operatively coupled to the traveling block comprise an instance of a rotary drilling state and another instance of a rotary drilling state, an instance of a slide drilling state and another instance of a slide drilling state, an instance of a rotary drilling state and an instance of a slide drilling state, or an instance of a slide drilling state and an instance of a rotary drilling state.

17. A system comprising:
   one or more processors;
   a network interface operatively coupled to the one or more processors;
   memory operatively coupled to the one or more processors; and
   processor-executable instructions stored in the memory and executable by at least one of the processors to instruct the system to:
      receive data associated with a drilling operation in a geologic environment that utilizes a rig that comprises a traveling block and a block position sensor that acquires a channel of block position data;
      determine a state as one of a plurality of states based at least in part on a portion of the data, wherein the portion of the data comprises multi-channel data acquired during the drilling operation by a plurality of different types of sensors, wherein the plurality of states comprises drilling states;
      represent the state using a symbolic representation scheme that comprises assigned letters;
      store the represented state to a database;
      for a string that comprises one or more of the assigned letters that represents a process as a sequence of one or more of the plurality of states that comprise at least one of the plurality of states temporally between instances of two of the drilling states for a corresponding length of drill pipe operatively coupled to the traveling block, perform a search engine based search of the database to generate a search result of one or more occurrences of the process; and
      render at least a portion of at least one of the one or more occurrences of the process to a display overlaid on at least a corresponding portion of the block position data with respect to time for the corresponding length of drill pipe.

18. The system of claim 17 wherein the string represents a sequence of state transitions.

19. One or more computer-readable storage media comprising computer-executable instructions executable to instruct a computing system to:
   receive data associated with a drilling operation in a geologic environment that utilizes a rig that comprises a traveling block and a block position sensor that acquires a channel of block position data;

determine a state as one of a plurality of states based at least in part on a portion of the data, wherein the portion of the data comprises multi-channel data acquired during the drilling operation by a plurality of different types of sensors, wherein the plurality of states comprises drilling states;

represent the state using a symbolic representation scheme that comprises assigned letters;

store the represented state to a database;

for a string that comprises one or more of the assigned letters that represents a process as a sequence of one or more of the plurality of states that comprise at least one of the plurality of states temporally between instances of two of the drilling states for a corresponding length of drill pipe operatively coupled to the traveling block, perform a search engine based search of the database to generate a search result of one or more occurrences of the process; and render at least a portion of at least one of the one or more occurrences of the process to a display overlaid on at least a corresponding portion of the block position data with respect to time for the corresponding length of drill pipe.

20. The one or more computer-readable storage media of claim 19 comprising computer-executable instructions executable to instruct a computing system to formulate queries for the search engine via a domain specific language (DSL).

* * * * *